(12) United States Patent
Oba

(10) Patent No.: US 9,987,917 B2
(45) Date of Patent: Jun. 5, 2018

(54) CONTROL APPARATUS FOR HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Hidehiro Oba, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/632,717

(22) Filed: Jun. 26, 2017

(65) Prior Publication Data
US 2018/0001757 A1    Jan. 4, 2018

(30) Foreign Application Priority Data
Jun. 29, 2016 (JP) ................................. 2016-128980

(51) Int. Cl.
| $B60W$ 10/02 | (2006.01) |
| $B60K$ 6/442 | (2007.10) |
| $B60K$ 6/543 | (2007.10) |
| $B60L$ 11/12 | (2006.01) |
| $B60L$ 15/20 | (2006.01) |
| $B60W$ 10/06 | (2006.01) |
| $B60W$ 10/08 | (2006.01) |
| $B60W$ 10/26 | (2006.01) |
| $B60W$ 20/10 | (2016.01) |

(52) U.S. Cl.
CPC .............. *B60K 6/442* (2013.01); *B60K 6/543* (2013.01); *B60L 11/123* (2013.01); *B60L 15/2045* (2013.01); *B60W 10/02* (2013.01); *B60W 10/06* (2013.01); *B60W 10/08* (2013.01); *B60W 10/26* (2013.01); *B60W 20/10* (2013.01)

(58) Field of Classification Search
CPC ...... B60W 20/00; B60W 20/10; B60W 20/15; B60W 10/04; B60W 10/08; B60K 6/44; B60K 6/442; B60K 6/46; B60K 6/48
See application file for complete search history.

(56) References Cited

U.S. PATENT DOCUMENTS

| 8,478,466 B2 * | 7/2013 | Luo .................. B60W 20/40 180/65.1 |
| 2013/0226387 A1 * | 8/2013 | Hayashi ............ B60K 6/442 701/22 |

(Continued)

FOREIGN PATENT DOCUMENTS

| EP | 1 297 981 A2 | 4/2003 |
| EP | 2 810 806 A1 | 12/2014 |

(Continued)

*Primary Examiner* — John D Walters
*Assistant Examiner* — James J Triggs
(74) *Attorney, Agent, or Firm* — Finnegan, Henderson, Farabow, Garrett & Dunner LLP

(57) ABSTRACT

An electronic control unit is configured to select one of a series mode, a series-parallel mode and a parallel mode as a running mode. A load level of a hybrid vehicle is set to a value that is high in the order of a load level at which the parallel mode is selected, a load level at which the series-parallel mode is selected, and a load level at which the series mode is selected. That is, the electronic control unit selects the series-parallel mode in an intermediate load region, selects the series mode in a low load region, and selects the parallel mode in a high load region.

7 Claims, 12 Drawing Sheets

(56) References Cited

U.S. PATENT DOCUMENTS

2014/0228165 A1* 8/2014 Frank .................. B60K 6/442
 477/5
2014/0288757 A1 9/2014 Hirasawa et al.

FOREIGN PATENT DOCUMENTS

| JP | 2012-86725 | 5/2012 |
| JP | 5767238 | 8/2015 |
| WO | WO 2008/074201 A1 | 6/2008 |

* cited by examiner

| RUNNING MODE | | | C1 | C2 | B1 | MG1 ELECTRICALLY LOCKED |
|---|---|---|---|---|---|---|
| EV RUNNING MODE | MG2 SINGLE DRIVE | | O | | | |
| | DOUBLE DRIVE | | | | O | |
| HV RUNNING MODE | SERIES | | O | | | |
| | SERIES-PARALLEL | | | O | | |
| | PARALLEL | FIRST SPEED | O | | O | |
| | | SECOND SPEED | | O | O | |
| | | THIRD SPEED | O | O | | |
| | | FOURTH SPEED | | O | | O |

CONTROL APPARATUS FOR HYBRID VEHICLE AND CONTROL METHOD FOR HYBRID VEHICLE

INCORPORATION BY REFERENCE

The disclosure of Japanese Patent Application No. 2016-128980 filed on Jun. 29, 2016 including the specification, drawings and abstract is incorporated herein by reference in its entirety.

BACKGROUND

1. Technical Field

The disclosure relates to a control apparatus for a hybrid vehicle that is configured to select one of a series mode, a series-parallel mode and a parallel mode as a running mode, and a control method for the hybrid vehicle.

2. Description of Related Art

A hybrid vehicle is equipped with an engine and a motor as driving force sources. Conventionally, series running, series-parallel running and parallel running are known as methods in which the hybrid vehicle runs using both the motive power of the engine and the motive power of the motor. These three running methods are different in motive power transmission path of the engine from one another.

Series running is a method in which the engine is connected to a generator, the motive power of the engine is transmitted to the generator and temporarily converted into an electric power, and the motor is driven by the electric power. That is, in series running, the motive power of the engine is transmitted to the generator and converted into an electric power.

Series-parallel running is a method in which the engine is connected to the generator and driving wheels via a motive power division mechanism (a planetary gear mechanism or the like), and the motive power of the engine is divided and transmitted to the generator and the driving wheels. That is, in series-parallel running, part of the motive power of the engine is transmitted to the generator and converted into an electric power, and the remaining motive power is mechanically transmitted to the driving wheels.

Parallel running is a method in which the engine and the motor are connected in parallel to the driving wheels, and both the motive power of the engine and the motive power of the motor are transmitted to the driving wheels. Accordingly, in parallel running, the motive power of the engine is mechanically transmitted to the driving wheels.

A hybrid vehicle that is configured to be able to make a changeover among the aforementioned three running modes (series running, series-parallel running and parallel running) as necessary is disclosed in, for example, Japanese Patent Application Publication No. 2012-86725 (JP 2012-86725 A).

SUMMARY

In Japanese Patent Application Publication No. 2012-86725 (JP 2012-86725 A), however, it is not disclosed how one of the aforementioned three running methods is selected. The aforementioned three running methods are different from one another in characteristics such as engine thermal efficiency and motive power transmission efficiency (the rate at which the motive power of the engine and the motive power of the motor are transmitted to the driving wheels) or the like, as a result of the differences in the motive power transmission path of the engine. In Japanese Patent Application Publication No. 2012-86725 (JP 2012-86725 A), however, nothing is disclosed as to the differences in characteristics among the respective running methods and the method of selecting a running method in consideration of the differences.

The present disclosure selects an optimal running mode in consideration of differences in characteristics among a series mode, a series-parallel mode and a parallel mode in a hybrid vehicle that is configured to select one of the respective running modes.

A first aspect of the disclosure is a control apparatus for a hybrid vehicle. The hybrid vehicle includes an engine, a first rotating electrical machine, an output shaft, a second rotating electrical machine, a planetary gear mechanism, a changeover device and an electronic control unit. The output shaft is connected to a driving wheel. The second rotating electrical machine is connected to the output shaft. The planetary gear mechanism mechanically couples the engine, the first rotating electrical machine and the output shaft to one another. The changeover device is configured to change a coupling state of the planetary gear mechanism with respect to the engine and the output shaft. The electronic control unit is configured to control the changeover device such that the coupling state of the planetary gear mechanism is changed. The electronic control unit is configured to select one of three running modes by changing the coupling state of the planetary gear mechanism in accordance with a load level of the hybrid vehicle. The three running modes are a series mode, a series-parallel mode and a parallel mode. The series mode is a mode in which a motive power of the engine is transmitted to the first rotating electrical machine and converted into an electric power. The series-parallel mode is a mode in which part of a motive power of the engine is mechanically transmitted to the output shaft by a torque of the first rotating electrical machine, and the remaining motive power of the engine is transmitted to one of the first rotating electrical machine and the second rotating electrical machine and converted into an electric power. The parallel mode is a mode in which a motive power of the engine is mechanically transmitted to the output shaft with a deceleration ratio mechanically fixed to a predetermined ratio. The deceleration ratio is a ratio of a rotational speed of the engine to a rotational speed of the output shaft. The load level of the hybrid vehicle becomes low in order of a first load level, a second load level and a third load level. The first load level is a level at which the parallel mode is selected. The second load level is a level at which the series-parallel mode is selected. The third load level is a level at which the series mode is selected.

According to the foregoing configuration, the running mode can be changed over to one of the series mode, the series-parallel mode and the parallel mode by changing the coupling state of the planetary gear mechanism through the control of the changeover device. The aforementioned three running modes are common to one another in that the hybrid vehicle runs with the engine in operation. On the other hand, the three running modes are different in characteristics (engine thermal efficiency and motive power transmission efficiency) from one another as a result of differences in a motive power transmission path, as will be described below.

The series mode is a mode in which the mechanical transmission of the motive power between the engine and the output shaft is shut off due to a change in the coupling state of the planetary gear mechanism. Therefore, the rotational speed of the engine can be adjusted to an optimal value without being bound by the vehicle speed. On the other hand, the series mode is premised on the driving of the second rotating electrical machine by the electric power generated by the first rotating electrical machine. In the series mode, therefore, a certain percentage of electric conversion loss is caused in each of the rotating electrical machines. Accordingly, the series mode has such characteristics that the motive power transmission efficiency falls by the electric conversion loss while the engine thermal efficiency can be optimized.

The series-parallel mode is a mode in which the rotational speed of the engine can be adjusted to an optimal value without being bound by the vehicle speed, by appropriately adjusting the rotational speed of the first rotating electrical machine in accordance with the vehicle speed (the rotational speed of the output shaft). On the other hand, in the series-parallel mode, the motive power transmission efficiency changes in accordance with the load level of the vehicle. In concrete terms, the deceleration ratio (the ratio of the rotational speed of the engine to the rotational speed of the output shaft) is small when the load is low. Then, when the first rotating electrical machine assumes a negative rotation state due to the small deceleration ratio, the motive power of the engine is converted into an electric power by the second rotating electrical machine. Then, there occurs a phenomenon in which the electric power is supplied to the first rotating electrical machine (which will be referred to hereinafter as "motive power circulation"), and a large loss is caused due to this motive power circulation. Therefore, the motive power transmission efficiency is lower in a low load region than in an intermediate load region. On the other hand, the deceleration ratio is large in a high load region. Then, when the first rotating electrical machine assumes a high rotation state due to the large deceleration ratio, the electric conversion loss becomes large. Therefore, the motive power transmission efficiency is lower when the load is high than when the load is intermediate, by the electric conversion loss. Accordingly, the series-parallel mode has characteristics in which the motive power transmission efficiency is mountainous in accordance with the load level of the vehicle (high in the intermediate load region and low in the low load region and the high load region) while the engine thermal efficiency can be optimized in the same manner as in the series mode.

In the parallel mode, the deceleration ratio is mechanically fixed to the predetermined ratio, and the engine and the output shaft are directly connected to each other, so the motive power of the engine can be more efficiently transmitted to the output shaft than in the other modes. Furthermore, the parallel mode is not premised on electric power conversion by each of the rotating electrical machines. Therefore, the electric conversion loss is also small in the parallel mode. Accordingly, the parallel mode is more excellent in motive power transmission efficiency than the other modes. On the other hand, in the parallel mode, the rotational speed of the engine is bound by the vehicle speed since the deceleration ratio is fixed to the predetermined ratio, so it may be impossible to operate the engine on an optimal fuel consumption operating line. However, the engine thermal efficiency is originally high when the load is high. As described hitherto, the parallel mode is more excellent in motive power transmission efficiency than the other modes, but on the other hand, may be less excellent in engine thermal efficiency than the other modes. It should be noted, however, that the engine thermal efficiency can be held at a rather high value when the load is high.

In consideration of the differences in characteristics as described above, according to the foregoing configuration, the load level of the hybrid vehicle is set in such a manner as to descend in the order of the load level at which the parallel mode is selected, the load level at which the series-parallel mode is selected, and the load level at which the series mode is selected. That is, in the intermediate load region, the series parallel mode, which is excellent in engine thermal efficiency and motive power transmission efficiency, is selected. In the low load region, the series mode is selected, so the motive power transmission efficiency can be restrained from falling, while maintaining a merit of being excellent in engine thermal efficiency. In the high load region, the parallel mode, which is more excellent in motive power transmission efficiency than the other modes and is rather high in engine thermal efficiency as well, is selected.

The foregoing configuration makes it possible to select an optimal running mode in consideration of characteristics of the series mode, the series-parallel mode and the parallel mode in a hybrid vehicle that is configured to be able to select one of the respective running modes.

In the control apparatus for the hybrid vehicle, the electronic control unit may be configured to determine the load level using a first predicted value as a parameter when the engine is assumed to be operated on an optimal fuel consumption operating line in the series-parallel mode. The first predicted value may be a predicted value of the deceleration ratio determined, by the electric control unit, from a driver's required driving force and a vehicle speed. The electronic control unit may be configured to select the series mode when the first predicted value is smaller than a first threshold. The electronic control unit may be configured to select the series-parallel mode when the first predicted value is larger than the first threshold and smaller than a second threshold. The electronic control unit may be configured to select the parallel mode when the first predicted value is larger than the second threshold.

According to the foregoing configuration, when the engine is assumed to be operated on the optimal fuel consumption operating line (a line obtained by linking maximum thermal efficiency points with respect to the rotational speed of the engine with one another) in the series-parallel mode, the electronic control unit determines the load level, using the predicted value of the deceleration ratio, which is determined from the driver's required driving force and the vehicle speed, as a parameter. When the predicted value of the deceleration ratio is smaller than the first threshold, it is determined that the load level is in the low load region where motive power circulation can occur in the series-parallel mode, and the series mode is selected. When the predicted value of the deceleration ratio is larger than the first threshold and smaller than the second threshold, it is determined that the load level is in the intermediate load region, and the series-parallel mode, which is best suited for the intermediate load region, is selected. When the predicted value of the deceleration ratio is larger than the second threshold, it is determined that the load level is in the high load region, and the parallel mode, which is best suited for the high load region, is selected. Thus, the optimal running mode corresponding to the load level can be selected.

In the control apparatus for the hybrid vehicle, the first threshold may be set to a value that is smaller than an optimal deceleration ratio by a first predetermined value. The optimal deceleration ratio may be the deceleration ratio when the engine is assumed to be operated on the optimal fuel consumption operating line in the series-parallel mode and a rotational speed of the first rotating electrical machine is assumed to be 0. The second threshold may be set to a value that is larger than the optimal deceleration ratio by a second predetermined value.

In the series-parallel mode, when the engine is operated on the optimal fuel consumption operating line and the rotational speed of the first rotating electrical machine is equal to 0, the engine thermal efficiency is optimized, the electric conversion loss of the first rotating electrical machine is minimized, and the motive power transmission efficiency is maximized. Therefore, according to the foregoing configuration, the first threshold is set to the value that is smaller than the optimal deceleration ratio (the deceleration ratio when the engine is operated on the optimal fuel consumption operating line and the rotational speed of the first rotating electrical machine is equal to 0) by the first predetermined value. Then, the second threshold is set to the value that is larger than the optimal deceleration ratio by the second predetermined value. Thus, the region where the series-parallel mode is selected includes the region where the deceleration ratio is equal to the optimal deceleration ratio. As a result, when the series-parallel mode is selected, the motive power transmission efficiency can be enhanced by making the deceleration ratio equal or close to the optimal deceleration ratio, while optimizing the engine thermal efficiency.

In the control apparatus for the hybrid vehicle, the electronic control unit may be configured to determine the load level using a second predicted value as a parameter. The second predicted value may be a predicted value of a rotational speed of the first rotating electrical machine, and is to be achieved when the engine is operated on an optimal fuel consumption operating line in the series-parallel mode. The electronic control unit may be configured to select the series mode when the second predicted value is smaller than a third threshold. The electronic control unit may be configured to select the series-parallel mode when the second predicted value is higher than the third threshold and lower than a fourth threshold. The electronic control unit may be configured to select the parallel mode when the second predicted value is higher than the fourth threshold.

According to the foregoing configuration, the electronic control unit determine the load level using, as the parameter, the predicted value of the rotational speed of the first rotating electrical machine, and is to be achieved when the engine is operated on the optimal fuel consumption operating line in the series-parallel mode. Then, when the predicted value of the rotational speed is lower than the first threshold, it is determined that the load level is in the low load region where motive power circulation can occur in the series-parallel mode, and the series mode is selected. When the predicted value of the rotational speed is higher than the third threshold and lower than the fourth threshold, it is determined that the load level is in the intermediate load region, and the series-parallel mode, which is best suited for the intermediate load region, is selected. When the predicted value of the rotational speed is higher than the fourth threshold, it is determined that the load level is in the high load region, and the parallel mode, which is best suited for the high load region, is selected. Thus, the optimal running mode corresponding to the load level can be selected.

In the control apparatus for the hybrid vehicle, the third threshold may be set to a negative value that is lower than 0 by a third predetermined value. The fourth threshold may be set to a positive value that is higher than 0 by a fourth predetermined value.

In the series-parallel mode, when the engine is operated on the optimal fuel consumption operating line and the rotational speed of the first rotating electrical machine is equal to 0, the engine thermal efficiency is optimized, the electric conversion loss of the first rotating electrical machine is minimized, and the motive power transmission efficiency is maximized. Therefore, according to the foregoing configuration, the third threshold is set to the value that is smaller than 0 by the third predetermined value, and the fourth threshold is set to the value that is larger than 0 by the fourth predetermined value. Thus, the region where the series-parallel mode is selected includes the region where the rotational speed of the first rotating electrical machine is equal to 0. As a result, when the series-parallel mode is selected, the motive power transmission efficiency can be enhanced by making the rotational speed of the first rotating electrical machine equal or close to 0, while optimizing the engine thermal efficiency.

In the control apparatus for the hybrid vehicle, the electronic control unit may be configured to determine the load level using a required driving torque of the hybrid vehicle as a parameter. The electronic control unit may be configured to select the series mode when the required driving torque is smaller than a third threshold. The electronic control unit may be configured to select the series-parallel mode when the required driving torque is larger than the third threshold and smaller than a fourth threshold. The electronic control unit may be configured to select the parallel mode when the required driving torque is larger than the fourth threshold.

According to the foregoing configuration, the electronic control unit determines the load level using the required driving torque of the hybrid vehicle as the parameter. Then, when the required driving torque is smaller than the third threshold, it is determined that the load level is in the low load region where motive power circulation occurs in the series-parallel mode, and the series mode is selected. When the required driving torque is larger than the third threshold and smaller than the fourth threshold, it is determined that the load level is in the intermediate load region, and the series-parallel mode, which is best suited for the intermediate load region, is selected. When the required driving torque is larger than the third threshold, it is determined that the load level is in the high load region, and the parallel mode, which is best suited for the high load region, is selected. Thus, the optimal running mode corresponding to the load level can be selected.

A second aspect of the disclosure is a control method for a hybrid vehicle. The hybrid vehicle includes an engine, a first rotating electrical machine, an output shaft, a second rotating electrical machine, a planetary gear mechanism, a changeover device and an electronic control unit. The output shaft is connected to a driving wheel. The second rotating electrical machine is connected to the output shaft. The planetary gear mechanism mechanically couples the engine, the first rotating electrical machine and the output shaft to one another. The changeover device is configured to change a coupling state of the planetary gear mechanism with respect to the engine and the output shaft. The control method includes: controlling, by the electronic control unit, the changeover device such that the coupling state of the planetary gear mechanism is changed, and selecting, by the electronic control unit, one of three running modes, by changing the coupling state of the planetary gear mechanism in accordance with a load level of the hybrid vehicle. The three running modes are a series mode, a series-parallel mode and a parallel mode. The series mode is a mode in which a motive power of the engine is transmitted to the first rotating electrical machine and converted into an electric power. The series-parallel mode is a mode in which part of a motive power of the engine is mechanically transmitted to the output shaft by a torque of the first rotating electrical machine, and the remaining motive power of the engine is transmitted to one of the first rotating electrical machine and the second rotating electrical machine and converted into an electric power. The parallel mode is a mode in which a motive power of the engine is mechanically transmitted to the output shaft with a deceleration ratio mechanically fixed to a predetermined ratio. The deceleration ratio is a ratio of a rotational speed of the engine to a rotational speed of the output shaft. The load level of the hybrid vehicle becomes low in order of a first load level, a second load level and a third load level. The first load level is a load level at which the parallel mode is selected. The second load level is a load level at which the series-parallel mode is selected. The third load level is a load level at which the series mode is selected.

The foregoing configuration makes it possible to select an optimal running mode in consideration of characteristics of the series mode, the series-parallel mode and the parallel mode in a hybrid vehicle that is configured to select one of the respective running modes.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
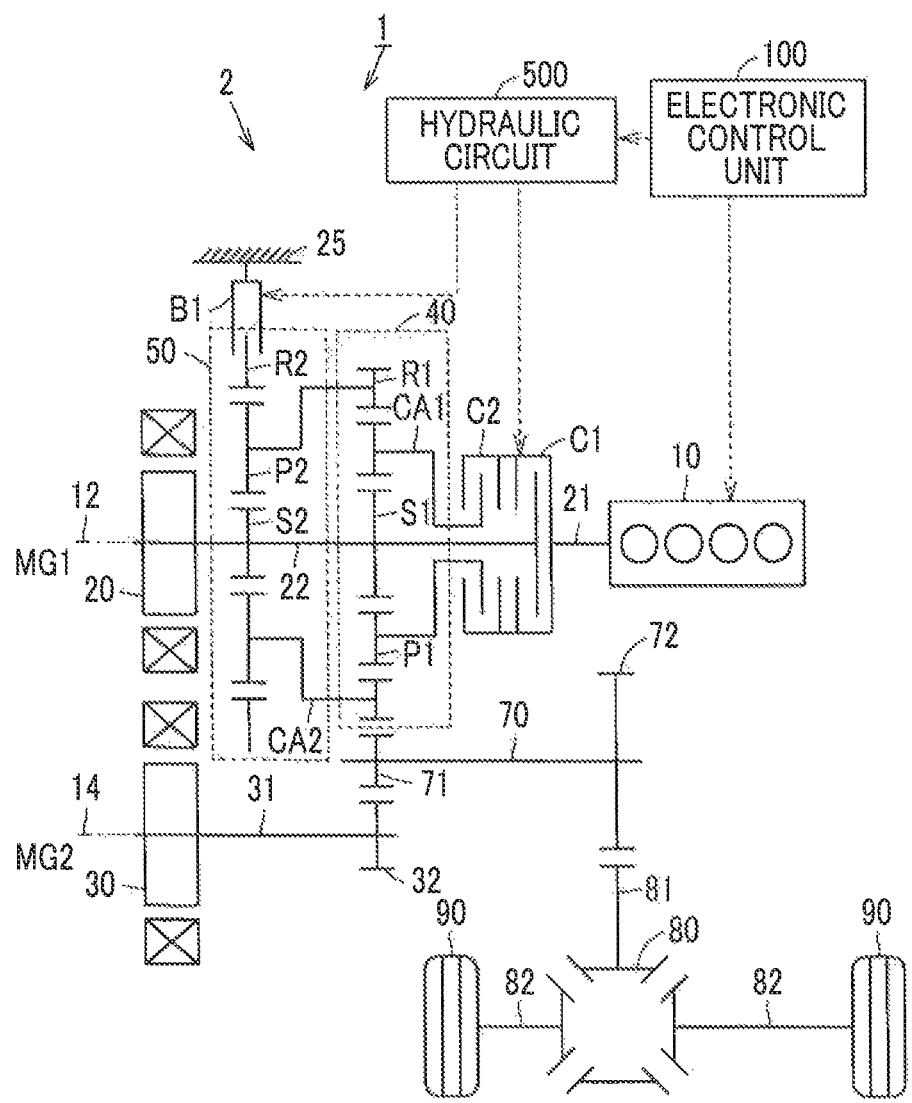
FIG. 1 is a view schematically showing an example of the general configuration of a hybrid vehicle.

The embodiment of the disclosure will be described hereinafter in detail with reference to the drawings. Incidentally, like or equivalent components in the drawings are denoted by like reference symbols, and the description thereof will not be repeated.

FIG. 1 is a view schematically showing an example of the general configuration of a vehicle 1 according to the present embodiment of the disclosure. The vehicle 1 includes a drive device 2, driving wheels 90, an electronic control unit 100 and a hydraulic circuit 500. The drive device 2 includes an engine 10, a first motor-generator (a first MG) 20, a second motor-generator (a second MG) 30, a first planetary gear device (a motive power division device) 40, a second planetary gear device 50, a clutch C1, a clutch C2 and a brake B1. The second planetary gear device 50, the clutches C1 and C2, the brake B1 and the hydraulic circuit 500 function as a changeover device. As will be described later, the changeover device changes over the connection state of the engine 10 and the first planetary gear device 40.

The vehicle 1 is a hybrid vehicle that runs using the motive power of at least one of the engine 10, the first MG 20 and the second MG 30. The engine 10 is, for example, an internal combustion engine such as a gasoline engine, a diesel engine or the like. Each of the first MG 20 and the second MG 30 is a rotating electrical machine (e.g., a permanent magnet-type three-phase AC rotating electrical machine) that functions as both a motor and a generator. The first MG 20 and the second MG 30 are electrically connected to a battery for driving (not shown). The first MG 20 is driven by at least one of the electric power generated by the second MG 30 and the electric power supplied from the battery for driving. The second MG 30 is driven by at least one of the electric power generated by the first MG 20 and the electric power supplied from the battery for driving.

A rotary shaft 22 is fixed to a rotor of the first MG 20, and a rotary shaft 31 is fixed to a rotor of the second MG 30. Incidentally, the rotary shaft 22 is arranged on a first axis 12, and the rotary shaft 31 is arranged on a second axis 14 that is parallel to the first axis 12.

The first MG 20, the second planetary gear device 50, the first planetary gear device 40, the clutch C2, the clutch C1 and the engine 10 are sequentially arranged on the first axis 12.

The second planetary gear device 50 includes a sun gear S2, a plurality of pinion gears P2, a carrier CA2 that connects the respective pinion gears P2 to one another, and a ring gear R2. The second planetary gear device 50 is a single planetary gear.

The sun gear S2 is fixed to the rotary shaft 22. The ring gear R2 is provided on an outer periphery side of the sun gear S2, and is arranged such that a rotation center thereof is coaxial with the first axis 12. The carrier CA2 is provided rotatably around the first axis 12, and rotatably supports the respective pinion gears P2. The respective pinion gears P2 are arranged between the sun gear S2 and the ring gear R2. The pinion gears P2 are provided rotatably around the sun gear S2 and rotatably around their own central axes.

As will be described later, there is established a relationship in which the rotational speed of the sun gear S2, the rotational speed of the carrier CA2 and the rotational speed of the ring gear R2 are linked with one another by a straight line on an alignment chart (a relationship in which if the rotational speeds of any two of the rotary elements are determined, the rotational speed of the other rotary element is also determined, which will be referred to hereinafter also as "a relationship of the alignment chart").

The first planetary gear device 40 includes a sun gear S1, a plurality of pinion gears P1, a carrier CA1 that connects the respective pinion gears P1 to one another, and a ring gear R1. The first planetary gear device 40 is a single planetary gear.

The sun gear S1 is fixed to the rotary shaft 22, and is provided rotatably around the first axis 12. Therefore, the rotary shaft 22, the sun gear S1 and the sun gear S2 rotate integrally with one another.

The ring gear R1 is arranged on an outer periphery side of the sun gear S1, and is provided rotatably around the first axis 12. The carrier CA2 is connected to the ring gear R1. The ring gear R1 and the carrier CA2 rotate integrally with each other.

The respective pinion gears P1 are arranged between the sun gear S1 and the ring gear R1, and mesh with the sun gear S1 and the ring gear R1. The pinion gears P1 are provided rotatably around the sun gear S1, and are provided rotatably around their own axes. The carrier CA1 rotatably supports the respective pinion gears P1, and is provided rotatably around the first axis 12.

As will be described later, there is established a relationship in which the rotational speed of the sun gear S1, the rotational speed of the carrier CA1 and the rotational speed of the ring gear R1 are linked with one another by a straight line on an alignment chart (the relationship of the alignment chart).

The brake B1 is provided on an outer periphery side of the ring gear R2, and is provided in a case 25 of the drive device 2. The brake B1 is a hydraulic frictional engagement element that can keep the ring gear R2 from rotating. When the brake B1 is engaged, the ring gear R2 is fixed to the case 25, and is kept from rotating. When the brake B1 is released, the ring gear R2 is allowed to rotate.

The clutch C2 is a hydraulic frictional engagement element that can couple a crankshaft 21 of the engine 10 and the carrier CA1 to each other. When the clutch C2 is engaged, the crankshaft 21 and the carrier CA1 are coupled to each other, and rotate integrally with each other. When the clutch C2 is released, the carrier CA1 is decoupled from the crankshaft 21.

The clutch C1 is a hydraulic frictional engagement element that can couple the rotary shaft 22 (the sun gear S1 and the sun gear S2) and the crankshaft 21 to each other. When the clutch C1 is engaged, the rotary shaft 22 and the crankshaft 21 are coupled to each other, and the motive power of the engine 10 can be directly transmitted to the first MG 20. On the other hand, when the clutch C1 is released, the crankshaft 21 of the engine 10 is decoupled from the rotary shaft 22.

Outer peripheral teeth that mesh with a driven gear 71 are formed on an outer peripheral surface of the ring gear R1. The driven gear 71 is fixed to one end side of a counter shaft (which will be referred to hereinafter also as "an output shaft") 70. The motive power from the engine 10 and the motive power from the first MG 20 are transmitted to the output shaft 70 through the ring gear R1 and the driven gear 71.

The output shaft 70 is arranged parallel to the first axis 12 and the second axis 14. A drive gear 72 is provided on the other end side of the output shaft 70. The drive gear 72 meshes with a differential ring gear 81 of a differential gear 80. A drive shaft 82 is connected to the differential gear 80. The driving wheels 90 are connected to the drive shaft 82. Therefore, rotation of the output shaft 70 is transmitted to the driving wheels 90 through the differential gear 80.

A reduction gear 32 is fixed to the rotary shaft 31 of the second MG 30. The reduction gear 32 meshes with the driven gear 71. Therefore, the motive power from the second MG 30 is transmitted to the output shaft 70 through the reduction gear 32.

Figures 2, 3:
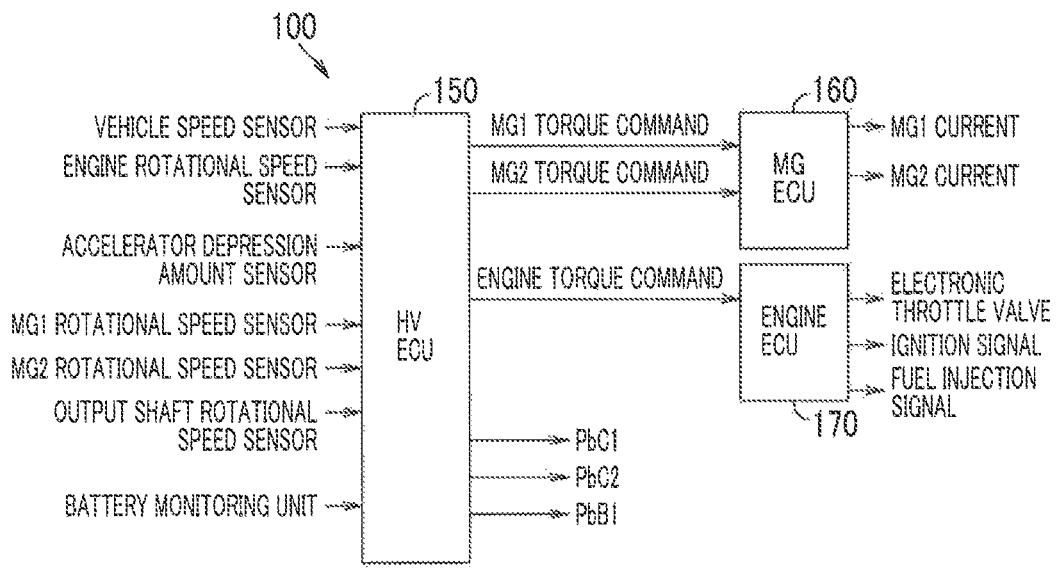
FIG. 2 is a block diagram showing an example of the configuration of a control apparatus.
FIG. 3 is an engagement chart showing control states in respective running modes.

FIG. 2 is a block diagram showing an example of the configuration of an electronic control unit 100 shown in FIG. 1. The electronic control unit 100 includes an HV electronic control unit (ECU) 150, an MGECU 160 and an engine ECU 170. Each of the HVECU 150, the MGECU 160 and the engine ECU 170 is configured to include a computer.

The MGECU 160 adjusts the value of a current that is supplied to the first MG 20 based on an MG1 torque command from the HVECU 150, and controls the output of the first MG 20. Besides, the MGECU 160 adjusts the value of a current that is supplied to the second MG 30 based on an MG2 torque command from the HVECU 150, and controls the output of the second MG 30.

The engine ECU 170 controls the output of the engine 10 by controlling the opening degree of an electronic throttle valve of the engine 10, the ignition timing of the engine 10, the fuel injection amount of the engine 10 and the like, based on an engine torque command from the HVECU 150.

The HVECU 150 comprehensively controls the entire vehicle. A vehicle speed sensor, an accelerator depression amount sensor, an engine rotational speed sensor, an MG1 rotational speed sensor, an MG2 rotational speed sensor, an output shaft rotational speed sensor, a battery monitoring unit and the like are connected to the HVECU 150. Through the use of these sensors, the HVECU 150 acquires a vehicle speed, an accelerator depression amount, a rotational speed of the engine 10, a rotational speed of the first MG 20, a rotational speed of the second MG 30, a rotational speed of the output shaft 70, a state of the battery for driving (not shown), and the like.

The HVECU 150 calculates a required driving force of the vehicle, a required power of the vehicle, a required torque of the vehicle or the like, based on the acquired information. The HVECU 150 determines an output torque of the first MG 20, an output torque of the second MG 30 and an output torque of the engine 10, based on the required value thus calculated. The HVECU 150 outputs a command value of an MG1 torque and a command value of an MG2 torque to the MGECU 160. Besides, the HVECU 150 outputs a command value of an engine torque to the engine ECU 170.

The HVECU 150 outputs command values (PbC1, PbC2) of oil pressures supplied to the clutches C1 and C2 respectively, and a command value (PbB1) of an oil pressure supplied to the brake B1, to the hydraulic circuit 500 of FIG. 1. The hydraulic circuit 500 supplies oil pressures corresponding to the command values PbC1, PbC2 and PbB1 to the clutches C1 and C2 and the brake B1 respectively. Thus, the states (engagement/release) of the clutches C1 and C2 and the brake B1 are changed over.

Incidentally, FIG. 1 shows an example in which the ECU is divided into three ECU's, namely, the HVECU 150, the MGECU 160 and the engine ECU 170, but the number of ECU's should not necessarily be three. The ECU may be divided into two, four or more ECU's.

Besides, these ECU's may be integrated into a single ECU as a whole. The HVECU 150, the MGECU 160 and the engine ECU 170 will be described hereinafter as the electronic control unit 100, instead of being distinguished from one another.

The running mode of the vehicle 1 includes a motor running mode (which will be referred to hereinafter as "an EV running mode") and a hybrid running (which will be referred to hereinafter as "HV running") mode.

The EV running mode is a mode in which the engine 10 is stopped and the vehicle 1 is caused to run by the motive power of at least one of the first MG 20 and the second MG 30. In the present embodiment of the disclosure, the EV running mode includes "an MG2 single drive mode" in which the motive power of the second MG 30 alone is used, and "a double drive mode" in which both the motive power of the first MG 20 and the motive power of the second MG 30 are used.

The HV running mode is a mode in which the engine 10 is operated and the vehicle 1 is caused to run by the motive power of the engine 10 and the motive power of at least one of the first MG 20 and the second MG 30. In the present embodiment of the disclosure, the HV running mode includes a series running mode (which will be referred to hereinafter simply as "a series mode" as well), a series-parallel running mode (which will be referred to hereinafter simply as "a series-parallel mode" as well), and a parallel running mode (which will be referred to hereinafter simply as "a parallel mode" as well).

In the series mode, the entire motive power of the engine 10 is transmitted to the first MG 20 and converted into an electric power, and the second MG 30 is driven by the electric power.

In the series-parallel mode, part of the motive power of the engine 10 is mechanically transmitted to the output shaft 70, and the remaining motive power is transmitted to the first MG 20 and converted into an electric power. The second MG 30 is driven by the electric power.

In the parallel mode, the motive power of the engine 10 is mechanically transmitted to the output shaft 70, and the motive power of at least one of the first MG 20 and the second MG 30 is transmitted to the output shaft 70 as necessary.

Incidentally, in any one of the series mode, the series-parallel mode and the parallel mode, an electric power can be generated by at least one of the first MG 20 and the second MG 30 as necessary, and the battery for driving can be charged with the electric power.

The electronic control unit 100 selects one of the aforementioned plurality of the running modes by controlling the control states (engagement/release) of the clutches C1 and C2 and the brake B1 and the driving of the engine 10, the first MG 20 and the second MG 30.

FIG. 3 is an engagement chart showing the control states of the clutches C1 and C2 and the brake B1 in the respective running modes. In FIG. 3, "C1", "C2", "B1", "MG1" and "MG2" denote the clutch C1, the clutch C2, the brake B1, the first MG 20 and the second MG 30. Each circle in respective sections of C1, C2 and B1 indicates "engagement", and each blank indicates "release".

In the MG2 single drive mode, the clutch C1 is engaged, and the clutch C2 and the brake B1 are released. In this state, the electronic control unit 100 stops the engine 10, and operates the second MG 30 as a motor. Thus, the sun gears S1 and S2, which are coupled to the engine 10, do not rotate. On the other hand, the ring gear R2 is not kept from rotating, so the output shaft 70 rotates in accordance with the torque of the second MG 30.

In the double drive mode, the brake B1 is engaged, and the clutches C1 and C2 are released. In this state, the electronic control unit 100 stops the engine 10, and operates the first MG 20 and the second MG 30 as motors. The brake B1 is engaged, and the ring gear R2 is kept from rotating, so the torque of the first MG 20 is transmitted to the output shaft 70 with the ring gear R2 serving as a fulcrum. Furthermore, the torque of the second MG 30 is also transmitted to the output shaft 70.

In the series mode, the clutch C1 is engaged, and the clutch C2 and the brake B1 are released. Thus, the engine 10 is coupled to the first MG 20, and the ring gear R2 is not kept from rotating, so the engine 10 can freely rotate without being bound by the vehicle speed (the rotational speed of the output shaft 70). In this state, the electronic control unit 100 operates the engine 10, operates the first MG 20 as a generator, and operates the second MG 30 as a motor. Thus, the motive power of the engine 10 is transmitted to the first MG 20 and temporarily converted into an electric power, and the second MG 30 is driven by the electric power.

In the series-parallel mode, the clutch C2 is engaged, and the other clutch C1 and the brake B1 are released. Thus, the engine 10 is coupled to the carrier CA1 of the first planetary gear device 40. Therefore, the engine 10 is coupled to the first MG 20 (the sun gear S1) and the output shaft 70 (the ring gear R1) via the first planetary gear device 40. In this state, the electronic control unit 100 operates the engine 10, and operates the second MG 30 as a motor. In this case, the electronic control unit 100 operates the first MG 20 such that the torque of the first MG 20 acts in a negative direction. Thus, the torque of the engine 10 is transmitted to the ring gear R1 (the output shaft 70) with the torque of the first MG 20 serving as a reactive force. Thus, in the series-parallel mode, part of the motive power of the engine 10 is transmitted to the first MG 20 and converted into an electric power, and the remaining motive power is mechanically transmitted to the output shaft 70 through the use of the torque of the first MG 20.

In the parallel mode, one of shift speeds, namely, first to fourth speeds that are different in a deceleration ratio γ (the ratio of the rotational speed of the engine 10 to the rotational speed of the output shaft 70) from one another is formed in accordance with a combination of the control states of the clutches C1 and C2 and the brake B1. When the first speed is formed, the clutch C1 and the brake B1 are engaged, and the clutch C2 is released. When the second speed is formed, the clutch C2 and the brake B1 are engaged, and the clutch C1 is released. When the third speed is formed, the clutch C1 and the clutch C2 are engaged, and the brake B1 is released. When the fourth speed is formed, the clutch C2 is engaged, and the clutch C1 and the brake B1 are released. Furthermore, when the fourth speed is formed, the current of the first MG 20 is subjected to feedback control such that the rotational speed of the first MG 20 is fixed to zero (this control will be referred to hereinafter also as "electric lock").

As described hitherto, in the parallel mode, one of the shift speeds, namely, the first to fourth speeds is formed, and the deceleration ratio γ is thereby mechanically fixed to a predetermined value corresponding to each of the shift speeds. In this state, the electronic control unit 100 operates the engine 10. Therefore, the motive power of the engine 10 can be mechanically efficiently transmitted to the output shaft 70. Besides, the electronic control unit 100 operates at least one of the first MG 20 and the second MG 30 as a motor, through the use of the electric power of the battery for driving, as necessary. Thus, the motive power of the first MG 20 and the motive power of the second MG 30 as well as the motive power of the engine 10 can be mechanically transmitted to the output shaft 70.

Figure 4:
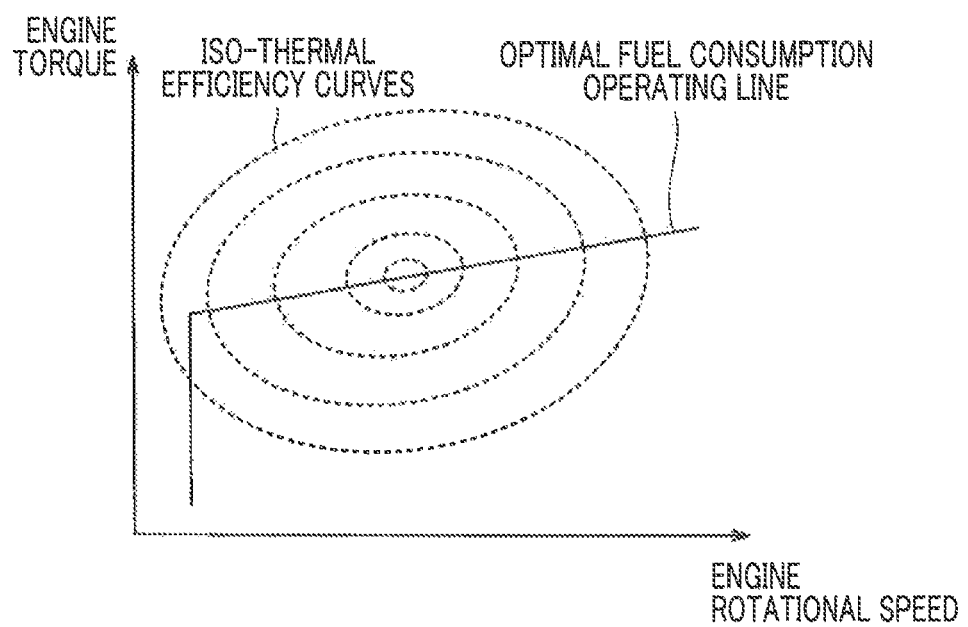
FIG. 4 is a view schematically showing iso-thermal efficiency curves and an optimal fuel consumption operating line of an engine.

FIG. 4 is a view schematically showing iso-thermal efficiency lines and an optimal fuel consumption operating line of the engine 10. In FIG. 4, the axis of abscissa represents the rotational speed of the engine 10, and the axis of ordinate represents the torque of the engine 10. In FIG. 4, the iso-thermal efficiency lines are indicated by substantially elliptical broken lines, and the optimal fuel consumption operating line is indicated by a solid line.

The iso-thermal efficiency curves (the broken lines) indicate that the thermal efficiency of the engine 10 (which will be referred to hereinafter also as "an engine thermal efficiency") improves and the fuel consumption rate (the consumption of fuel per unit work) decreases (improves) as the area of an ellipse forming each of the iso-thermal efficiency curves decreases. Accordingly, the region surrounded by the iso-thermal efficiency curve formed by the innermost ellipse is a region with the best engine thermal efficiency (a region with the best fuel consumption rate).

The optimal fuel consumption operating line (the solid line) is an operating line of the engine 10 that is determined in advance by a designer using, as a reference, a line obtained by linking operating points at which the engine thermal efficiency is maximized (the fuel consumption rate is minimized) with respect to the rotational speed of the engine 10. Accordingly, the engine thermal efficiency is good when the engine 10 is operated on the optimal fuel consumption operating line.

As described above, the vehicle 1 can make a changeover between the EV running mode in which the vehicle 1 runs with the engine 10 stopped and the HV running mode in which the vehicle 1 runs with the engine 10 in operation. Furthermore, in the HV running mode, a changeover among the series mode, the series-parallel mode and the parallel mode can be made. The electronic control unit 100 according to the present embodiment of the disclosure selects one of these running modes in accordance with the load level of the vehicle 1.

Figure 5:
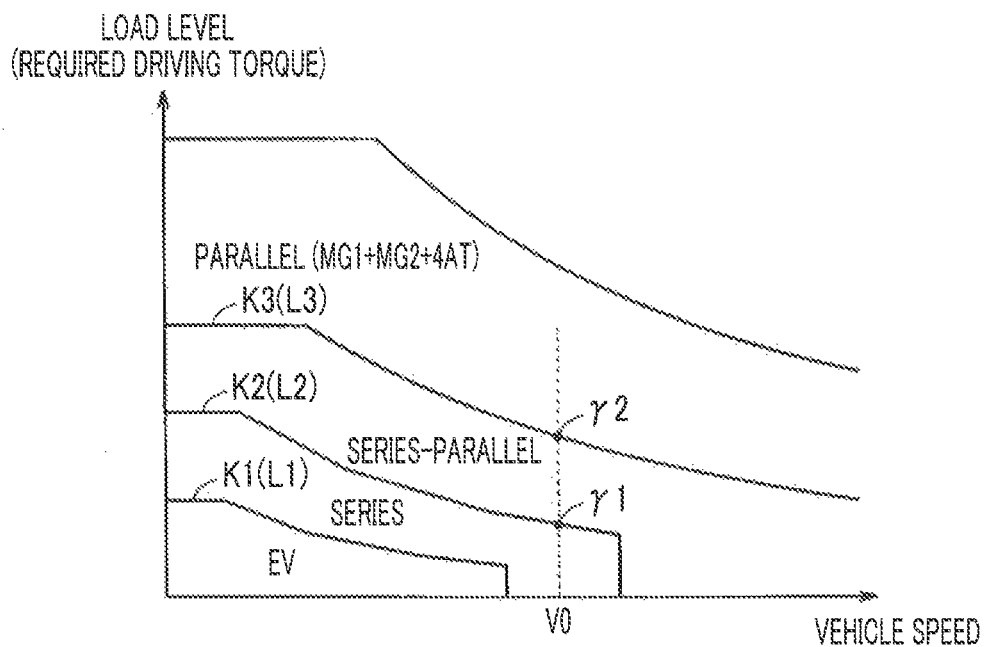
FIG. 5 is a view showing an image of a load level at which each of the running modes is selected.

FIG. 5 is a view showing an image of the load levels at which the respective running modes are selected. Incidentally, the axis of ordinate represents the required driving torque of the vehicle 1 as a parameter indicating the load level. The axis of abscissa of FIG. 5 represents the vehicle speed. A line K1 indicates that the load level is equal to a first level value L1. A line K2 indicates that the load level is equal to a second level value L2. A line K3 indicates that the load level is equal to a third level value L3. As shown in FIG. 5, each of the level values L1 to L3 is a variable value that is changed in a decreasing manner as the vehicle speed rises.

As shown in FIG. 5, in a region where the load level (the required driving torque) is lower than the first level value L1, the engine thermal efficiency is low, so the EV running mode is selected. In a region where the load level is higher than the first level value L1, the HV running mode in which the vehicle runs with the engine 10 in operation is selected.

In the HV running mode, one of the series mode, the series-parallel mode and the parallel mode is selected. In the present embodiment of the disclosure, as shown in FIG. 5, the load level of the vehicle 1 descends in the order of the load level at which the parallel mode is selected, the load level at which the series-parallel mode is selected, and the load level at which the series mode is selected. That is, in a low load region where the load level is higher than the first level value L1 and lower than a second level value L2 (L2>L1), the series mode is selected. In an intermediate load region where the load level is higher than the second level value L2 and lower than a third level value L3 (L3>L2), the series-parallel mode is selected. In a high load region where the load level is higher than the third level value L3, the parallel mode is selected.

As described hitherto, in the case where the HV running mode is selected, the electronic control unit 100 according to the present embodiment of the disclosure selects the series mode when the load is low, selects the series-parallel mode when the load is intermediate, and selects the parallel mode when the load is high. Thus, the optimal running mode can be selected in consideration of the differences in characteristics among the respective running modes. The reason for this will be described hereinafter in detail.

While the three running modes, namely, the series mode, the series-parallel mode and the parallel mode are identical to one another in that the vehicle runs with the engine 10 in operation, they are different from one another in motive power transmission efficiency (the rate at which the motive power of the engine 10, the motive power of the MG 20 and the motive power of the MG 30 are transmitted to the output shaft 70) and engine thermal efficiency (the fuel consumption rate of the engine 10). Thus, the differences in motive power transmission efficiency and engine thermal efficiency among the respective running modes will be described.

First of all, the differences in motive power transmission efficiency among the respective running modes will be described.

Figure 6:
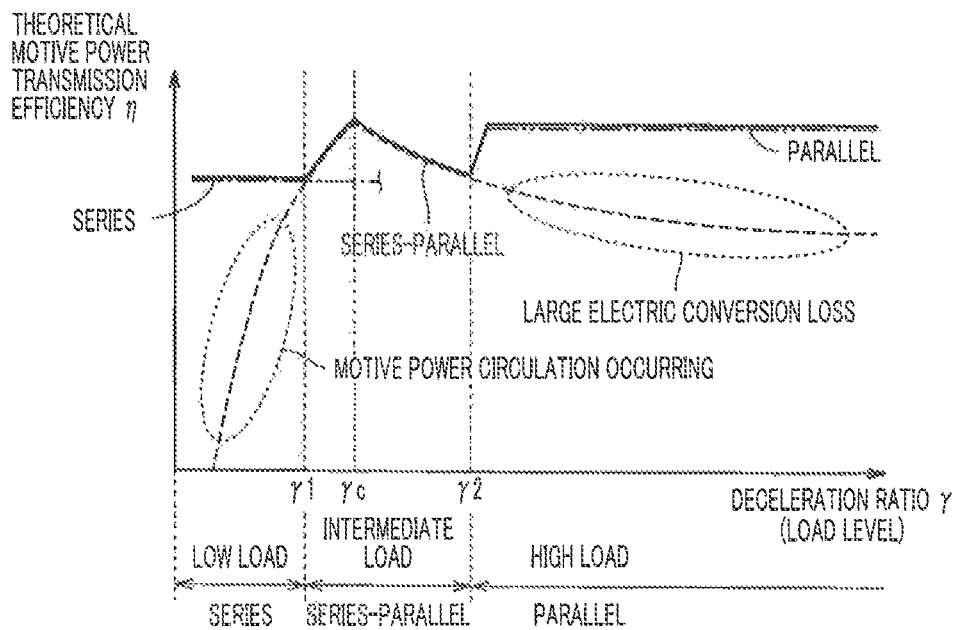
FIG. 6 is a view schematically showing a corresponding relationship between the load level and a motive power transmission efficiency in each of the running modes.

FIG. 6 is a view schematically showing a corresponding relationship between the load level and the motive power transmission efficiency in each of the running modes in the case where the vehicle speed is constantly equal to a predetermined value V0 (see FIG. 5). Incidentally, in FIG. 6, the axis of abscissa represents the deceleration ratio $\gamma$ as a parameter indicating the load level, and the axis of ordinate represents a theoretical transmission efficiency $\eta$ (a theoretical motive power transmission efficiency). Incidentally, it is meant that the load level rises as the deceleration ratio $\gamma$ increases. In FIG. 6, the theoretical transmission efficiency $\eta$ in the series-parallel mode is indicated by a broken line, the theoretical transmission efficiency $\eta$ in the series mode is indicated by an alternate long and short dash line, and the theoretical transmission efficiency $\eta$ in the parallel mode is indicated by an alternate long and two short dashes line. Respective thresholds $\gamma 1$ and $\gamma 2$ (which will be described later) shown in FIG. 6 correspond to the second level value L2 and the third level value L3 respectively when the vehicle speed is equal to the predetermined value V0, as shown in FIG. 5. Accordingly, the respective thresholds $\gamma 1$ and $\gamma 2$ are variable values that are changed in a decreasing manner as the vehicle speed rises.

The theoretical transmission efficiency $\eta$ in the series-parallel mode (indicated by the broken line) is maximized when the deceleration ratio $\gamma$ is equal to an optimal deceleration ratio $\gamma_c$. Then, in a region where the deceleration ratio $\gamma$ is smaller than the optimal deceleration ratio $\gamma_c$, the theoretical transmission efficiency $\eta$ in the series-parallel mode decreases as the deceleration ratio $\gamma$ decreases. Furthermore, in a region where the deceleration ratio $\gamma$ is larger than the optimal deceleration ratio $\gamma_c$, the theoretical transmission efficiency $\eta$ in the series-parallel mode decreases as the deceleration ratio $\gamma$ increases. It should be noted herein that the optimal deceleration ratio $\gamma_c$ is the deceleration ratio $\gamma$ at the time when the rotational speed of the first MG 20 (which will be referred to hereinafter also as "a first MG rotational speed Nm1") is equal to 0.

Figure 7:
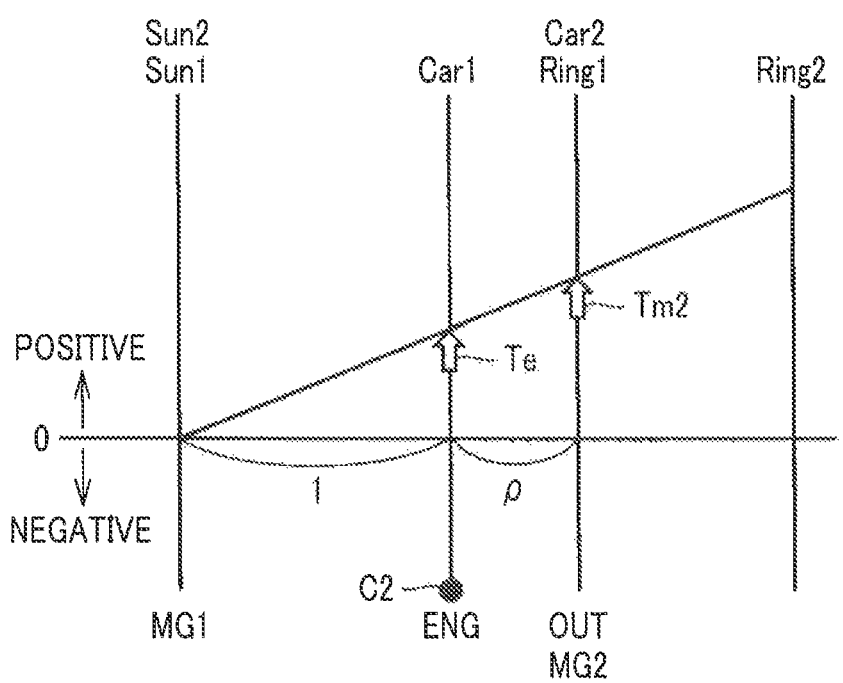
FIG. 7 shows an alignment chart in the case where a deceleration ratio γ is equal to an optimal deceleration ratio $γ_c$ during a series-parallel mode.
Figure 8:
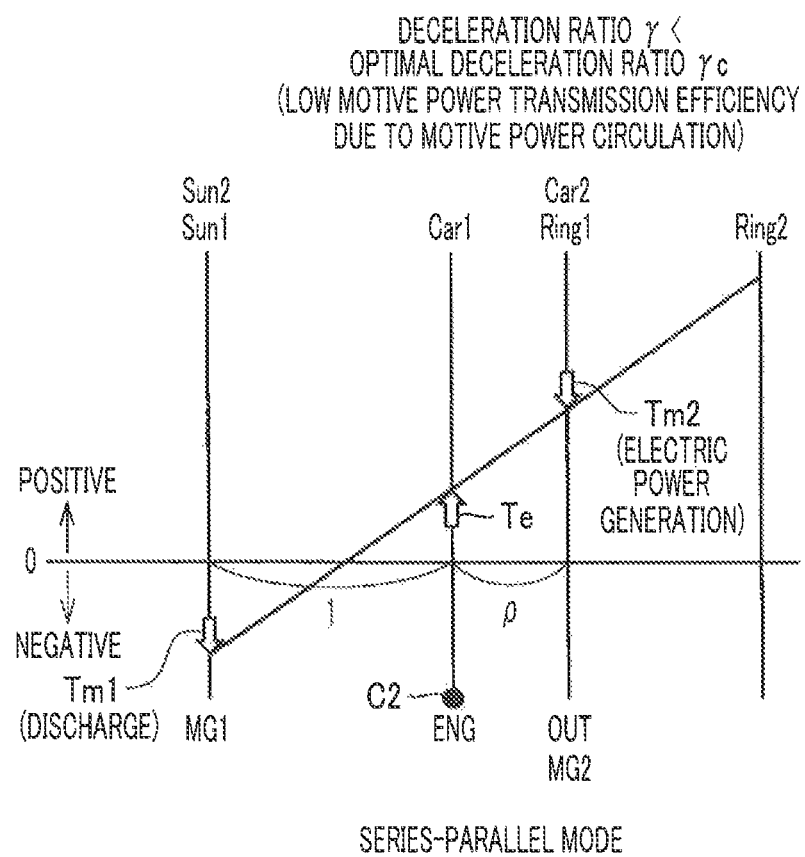
FIG. 8 shows an alignment chart in the case where the deceleration ratio γ is smaller than the optimal deceleration ratio $γ_c$ during the series-parallel mode.

FIG. 7 shows an alignment chart in the case where the deceleration ratio $\gamma$ is equal to the optimal deceleration ratio $\gamma_c$ in the series-parallel mode. FIG. 8 shows an alignment chart in the case where the deceleration ratio $\gamma$ is smaller than the optimal deceleration ratio $\gamma_c$ in the series-parallel mode. In each of the alignment charts shown in FIGS. 7 and 8, rotational speeds of the rotary elements (the sun gears S1 and S2, the carriers CA1 and CA2 and the ring gears R1 and R2) of each of the first planetary gear device 40 and the second planetary gear device 50 are indicated by vertical lines respectively. Furthermore, the intervals among the vertical lines correspond to the gear ratios of each of the first planetary gear device 40 and the second planetary gear device 50 respectively. Then, the up-and-down direction of each of the vertical lines is a rotational direction (the upward direction of each of the vertical lines is a positive direction, and the downward direction of each of the vertical lines is a negative direction), and the position in the up-and-down direction is a rotational speed. In FIGS. 7 and 8, "Sun1" denotes the sun gear S1, "Sun 2" denotes the sun gear S2, "Car1" denotes the carrier CA1, "Car2" denotes the carrier CA2, "Ring1" denotes the ring gear R1, and "Ring2" denotes the ring gear R2. Besides, "C2" denotes the clutch C2, and a black circle of C2 indicates "engagement". "ENG" denotes the engine 10, "MG1" denotes the first MG 20, "MG2" denotes the second MG 30, and "OUT" denotes the output shaft 70. "Te" denotes a torque of the engine 10 (which will be referred to hereinafter as "an engine torque"), "Tm1" denotes a torque of the first MG 20 (which will be referred to hereinafter as "a first MG torque"), and "Tm2" denotes a torque of the second MG 30 (which will be referred to hereinafter as "a second MG torque").

In the series-parallel mode, as described above, the clutch C2 is engaged, and the other clutch C1 and the brake B1 are released. Thus, the engine 10 is coupled to the carrier CA1 of the first planetary gear device 40.

As shown in FIG. 7, when the deceleration ratio γ is equal to the optimal deceleration ratio $γ_c$, the first MG rotational speed Nm1 is equal to 0, and the electric conversion loss of the first MG 20 is minimized, so the motive power transmission efficiency is maximized.

As shown in FIG. 8, when the deceleration ratio γ is smaller than the optimal deceleration ratio $γ_c$ in the series-parallel mode, the first MG 20 is in a negative rotation state (Nm1<0) due to the relationship of the alignment chart. In this state, with a view to applying the first MG torque Tm1 in a negative direction to transmit the motive power of the engine 10 to the output shaft 70, the first MG 20 needs to be driven by being supplied with electric power. Furthermore, when the motive power transmitted to the output shaft 70 from the engine 10 is excessive, the second MG 30 needs to generate electric power to apply the second MG torque Tm2 in the negative direction. That is, the motive power of the engine 10 transmitted to the output shaft 70 using, as a reactive force, the first MG torque Tm1 obtained through the driving of the first MG 20 is converted into an electric power by the second MG 30. Then, there may occur a phenomenon in which the electric power is returned to the first MG 20 and used to drive the first MG 20 (which will be referred to hereinafter as "motive power circulation"). This motive power circulation leads to a large loss, so the theoretical transmission efficiency becomes low.

On the other hand, in the high load region, when the deceleration ratio γ becomes large and the rotational speed of the first MG 20 assumes a positive high value due to this influence, the electric conversion loss becomes large. Therefore, the motive power transmission efficiency is lower when the load is high than when the load is intermediate.

Accordingly, the theoretical transmission efficiency η in the series-parallel mode has the characteristics of being mountainous in accordance with the deceleration ratio γ (the load level) (being high in the intermediate load region and low in the low load region and the high load region), as shown in FIG. 6.

Incidentally, in the series-parallel mode, the theoretical transmission efficiency η in the case where the deceleration ratio γ is larger than the optimal deceleration ratio $γ_c$ is expressed by an expression (1) shown below, and the theoretical transmission efficiency η in the case where the deceleration ratio γ is smaller than the optimal deceleration ratio $γ_c$ is expressed by an expression (2) shown below.

$$η=\{γ_c/γ+(1-γ_c/γ)η_1η_2\}η_m \quad (1)$$

$$η=\{γ_c/γ+(1-γ_c/γ)/η_1η_2\}η_m \quad (2)$$

In the aforementioned expressions (1) and (2), "$η_1$" and "$η_2$" denote the efficiency of the first MG 20 and the efficiency of the second MG 30 respectively. "$η_m$" denotes the machine efficiency of the first planetary gear device 40. The optimal deceleration ratio $γ_c$ is expressed by an expression (3) shown below.

$$γ_c=1/1+ρ \quad (3)$$

In the aforementioned expression (3), "ρ" denotes the gear ratio of the first planetary gear device 40 (=the number of teeth of the sun gear S1/the number of teeth of the ring gear R1).

The series mode is premised on the driving of the second MG 30 by the electric power generated by the first MG 20. In the series mode, therefore, a certain percentage of electric conversion loss is caused in each of the MG's 20 and 30. Accordingly, the theoretical transmission efficiency η the series mode (indicated by the alternate long and short dash line) is lower than the peak value of the theoretical transmission efficiency η the series-parallel mode by the electric conversion loss of the first MG 20.

In the parallel mode, the deceleration ratio γ is fixed, and the engine 10 and the output shaft 70 are directly connected to each other, so the motive power of the engine 10 can be more efficiently transmitted to the output shaft 70 than in the other modes. Furthermore, the parallel mode is not premised on electric power conversion by each of the MG's 20 and 30. In the parallel mode, therefore, the electric conversion loss is also small. Accordingly, the theoretical transmission efficiency η in the parallel mode (indicated by the alternate long and two short dashes line) is as high as the peak value of the theoretical transmission efficiency η in the series-parallel mode.

Due to the differences as described above, as shown in FIG. 6, in the low load region where the deceleration ratio γ is smaller than a threshold γ1 that is smaller than the optimal deceleration ratio $γ_c$ by a predetermined value, the theoretical transmission efficiency η in the series mode (indicated by the alternate long and short dash line) is higher than the theoretical transmission efficiency 11 in the series-parallel mode (indicated by the broken line). In the intermediate load region where the deceleration ratio γ is between the threshold γ1 and a threshold γ2, the theoretical transmission efficiency η in the series-parallel mode (indicated by the broken line) is higher than the theoretical transmission efficiency η in the series mode (indicated by the alternate long and short dash line). Besides, in the high load region where the deceleration ratio γ is larger than the threshold γ2, which is larger than the optimal deceleration ratio $γ_c$ by a predetermined value, the theoretical transmission efficiency η in the parallel mode (indicated by the alternate long and two short dashes line) is higher than the theoretical transmission efficiency η in the series-parallel mode (indicated by the broken line).

Next, the differences in engine thermal efficiency among the respective running modes will be described.

In the series-parallel mode, the engine 10 is connected to the carrier CA1 of the first planetary gear device 40.

Therefore, the rotational speed of the engine 10 (the rotational speed of the carrier CA1) can be adjusted to an optimal value without being bound by the vehicle speed, by appropriately adjusting the rotational speed of the first MG 20 (the rotational speed of the sun gear S1) in accordance with the vehicle speed (the rotational speed of the ring gear R1). Accordingly, the engine thermal efficiency can be made equal to an optimal value in the series-parallel mode.

Besides, in the series mode, the clutch C1 is engaged, the engine 10 is coupled to the first MG 20, and the clutch C2 and the brake B1 are released. Therefore, the rotational speed of the engine 10 can be adjusted to the optimal value without being bound by the vehicle speed. Accordingly, in the series mode as well as the series-parallel mode, the engine thermal efficiency can be made equal to the optimal value.

On the other hand, in the parallel mode, the deceleration ratio γ is mechanically fixed to a predetermined value corresponding to a shift speed, so the rotational speed of the engine 10 is bound by the vehicle speed. Therefore, it may be impossible to optimize the engine thermal efficiency. However, when the load is high, the engine thermal efficiency is originally high, and is not substantially different from the engine thermal efficiency in each of the other modes.

In view of the differences in characteristics as described above, as shown in FIG. 5, in the vehicle 1 according to the present embodiment of the disclosure, the load level is set to a value that descends in the order of the load level at which the parallel mode is selected, the load level at which the series-parallel mode is selected, and the load level at which the series mode is selected. That is, in the intermediate load region, the series-parallel mode, which is excellent in engine thermal efficiency and motive power transmission efficiency, is selected. In the low load region, the series mode is selected. Therefore, while there is a merit that the engine thermal efficiency can be made equal to the optimal value, the motive power transmission efficiency can be restrained more from falling than in the case where the series-parallel mode is selected. In the high load region, the parallel mode, which is more excellent in motive power transmission efficiency than the other modes and not substantially different in engine thermal efficiency either from the other modes, is selected. Therefore, the optimal running mode can be selected in consideration of the characteristics (the engine thermal efficiency and the motive power transmission efficiency) of the respective running modes.

Figure 9:
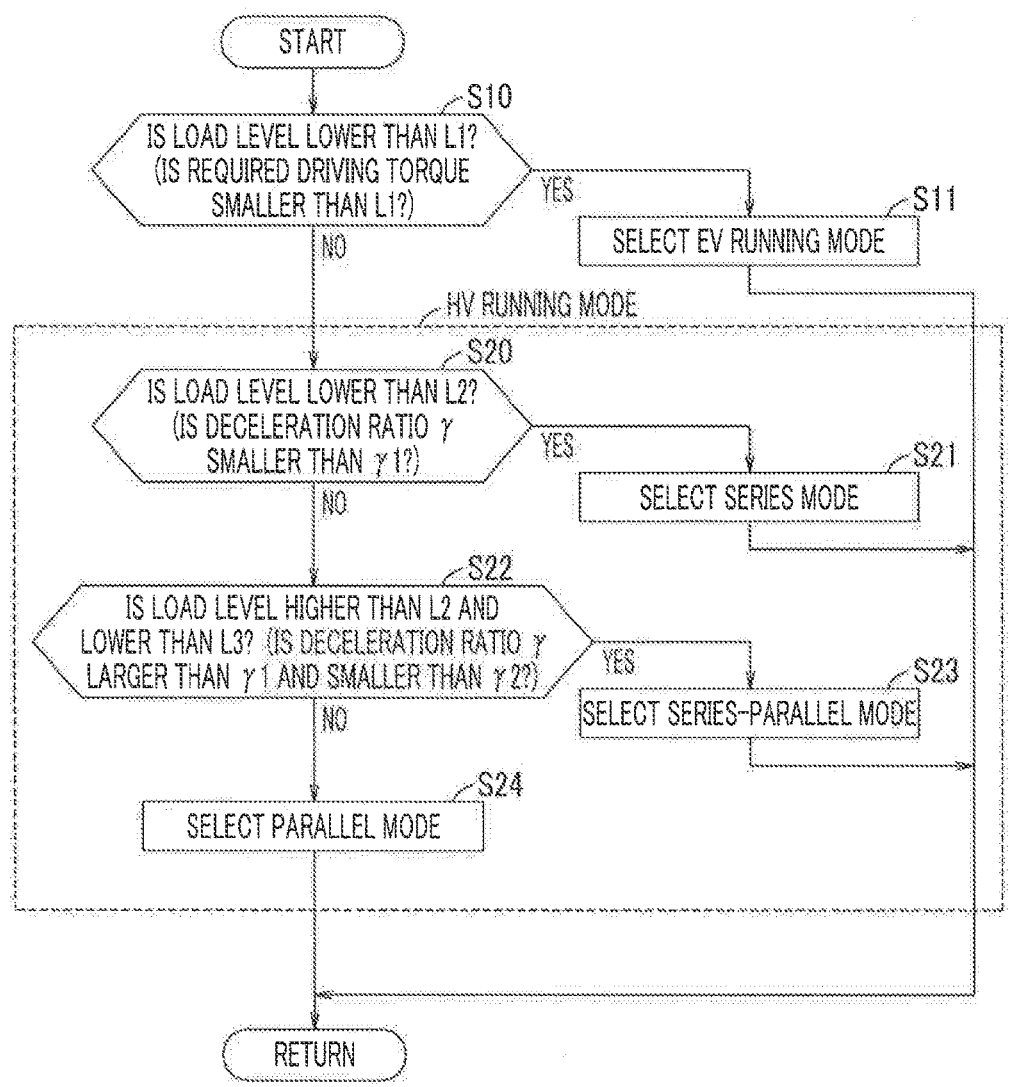
FIG. 9 is a flowchart (part 1) showing an exemplary processing procedure of the control apparatus.

FIG. 9 is a flowchart showing an exemplary processing procedure at the time when the electronic control unit 100 selects a running mode. This flowchart is repeatedly executed on a predetermined cycle.

In step (the word "step" will be abbreviated hereinafter as "S") 10, the electronic control unit 100 determines whether or not the load level is lower than the first level value L1. In making this determination, a required driving torque is used as the load level. That is, the electronic control unit 100 calculates the required driving torque from an accelerator depression amount (an amount of operation of an accelerator pedal by a driver) or the like, calculates the first level value L1 from a vehicle speed, and determines whether or not the required driving torque is smaller than the first level value L1 (see FIG. 5).

If the load level is lower than the first level value L1 (YES in S10), the electronic control unit 100 selects the EV running mode in S11. Incidentally, in the EV running mode, as described above, one of the MG2 single drive mode and the double drive mode is selected.

On the other hand, if the load level is higher than the first level value L1 (NO in S10), the electronic control unit 100 selects the HV running mode, and carries out the processes starting from S20.

In S20, the electronic control unit 100 determines whether or not the load level is a low load level that is lower than the second level value L2. In making this determination, a predicted value of the deceleration ratio γ that is determined from the driver's required driving force and the vehicle speed in the case where the engine 10 is assumed to be operated on the optimal fuel consumption operating line in the series-parallel mode (which will be referred to hereinafter simply as "the predicted value of the deceleration ratio γ" as well) is used as the load level. The electronic control unit 100 calculates an optimal rotational speed of the engine 10 that satisfies the required driving force (a rotational speed of the engine 10 in outputting the required driving force on the optimal fuel consumption operating line), and calculates the predicted value of the deceleration ratio γ by dividing the optimal rotational speed of the engine 10 by the rotational speed of the output shaft 70 corresponding to the current vehicle speed. Then, the electronic control unit 100 calculates the threshold γ1 from the vehicle speed, and determines whether or not the predicted value of the deceleration ratio γ is smaller than the threshold γ1 (see FIG. 6).

If the load level is the low load level (YES in S20), namely, if the predicted value of the deceleration ratio γ is smaller than the threshold γ1, the electronic control unit 100 selects the series mode, which can optimize the engine thermal efficiency and is more excellent in motive power transmission efficiency than the parallel mode, in S21.

If the load level is not the low load level (NO in S20), the electronic control unit 100 determines in S22 whether or not the load level is an intermediate load level that is higher than the second level value L2 and lower than the third level value L3. Incidentally, in the determination of S22 as well as the determination of S20, the predicted value of the deceleration ratio γ is used as the load level. The electronic control unit 100 calculates the threshold γ2 from the vehicle speed, and determines whether or not the predicted value of the deceleration ratio γ is larger than the threshold γ1 and smaller than the threshold γ2 (see FIG. 6).

If the load level is the intermediate load level (YES in S22), namely, if the predicted value of the deceleration ratio γ is larger than the threshold γ1 and smaller than the threshold γ2, the electronic control unit 100 selects the series-parallel mode, which can optimize the engine thermal efficiency and is more excellent in motive power transmission efficiency than the series mode, in S23.

If the load level is not the intermediate load level (NO in S22), the predicted value of the deceleration ratio γ is larger than the threshold γ2 and hence is at a high load level (see FIG. 6). Therefore, the electronic control unit 100 selects the parallel mode, which is more excellent in motive power transmission efficiency than the other modes and is not substantially different in engine thermal efficiency either from the other modes, in S24. Incidentally, in the parallel mode, as described above, one of the shift speeds, namely, the first to fourth speeds is formed in accordance with the accelerator depression amount, the vehicle speed and the like.

As described above, in the vehicle 1 according to the present embodiment of the disclosure, the load level at which the parallel mode is selected, the load level at which the series-parallel mode is selected, and the load level at which the series mode is selected are set in such a manner as to descend in this order. That is, in the intermediate load region, the series-parallel mode, which is excellent in engine thermal efficiency and motive power transmission efficiency, is selected. In the low load region, the series mode, which can restrain the motive power transmission efficiency from falling while maintaining a merit of being excellent in engine thermal efficiency, is selected. In the high load region, the parallel mode, which is more excellent in motive power transmission efficiency than the other modes and is not substantially different in engine thermal efficiency either from the other modes, is selected. Therefore, the optimal running mode can be selected in consideration of the characteristics (the engine thermal efficiency and the motive power transmission efficiency) of the respective running modes.

Furthermore, in the present embodiment of the disclosure, the predicted value of the deceleration ratio γ is used as the parameter indicating the load level in the HV running mode. Therefore, the optimal running mode that takes the corresponding relationship between the deceleration ratio γ and the motive power transmission efficiency (see FIG. 6) into account can be selected.

Furthermore, in the present embodiment of the disclosure, when the predicted value of the deceleration ratio γ is larger than the threshold γ1 and smaller than the threshold γ2, the series-parallel mode is selected. Then, in consideration of the fact that the motive power transmission efficiency in the series-parallel mode is maximized at the optimal deceleration ratio $\gamma_c$ (see FIG. 6), "the threshold γ1" is set to a value that is smaller than the optimal deceleration ratio $\gamma_c$ by the predetermined value, and "the threshold value γ2" is set to a value that is larger than the optimal deceleration ratio $\gamma_c$ by the predetermined value. Thus, the region where the series-parallel mode is selected includes the region where the deceleration ratio γ is equal to the optimal deceleration ratio $\gamma_c$. As a result, when the series-parallel mode is selected, the motive power transmission efficiency can be held at a high level by making the deceleration ratio γ equal or close to the optimal deceleration ratio $\gamma_c$ while optimizing the engine thermal efficiency.

The above-mentioned embodiment of the disclosure can be changed, for example, as follows. In the above-mentioned embodiment of the disclosure, the predicted value of the deceleration ratio γ is used as the parameter indicating the load level in the HV running mode. However, instead of the predicted value of the deceleration ratio γ, a predicted value of the first MG rotational speed Nm1 in the case where the engine 10 is assumed to be operated on the optimal fuel consumption operating line in the series-parallel mode (which will be referred to hereinafter simply as "the predicted value of the first MG rotational speed Nm1" as well) may be used as the parameter indicating the load level. Incidentally, when the vehicle speed is constant, there is established a relationship in which the first MG rotational speed Nm1 falls as the deceleration ratio γ decreases. That is, in the present first modification example, the first MG rotational speed Nm1, which is correlated with the deceleration ratio γ, is used as the parameter indicating the load level.

Figure 10:
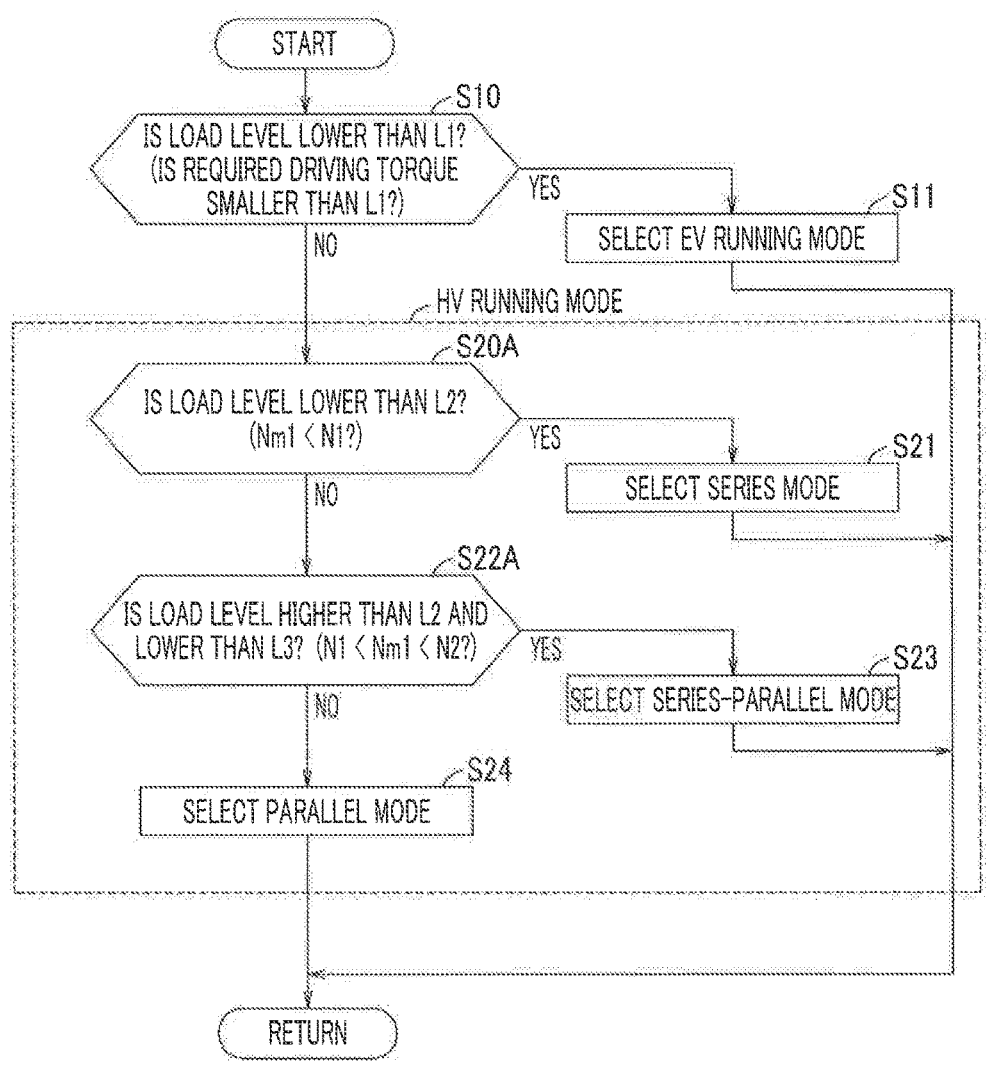
FIG. 10 is a flowchart (part 2) showing an exemplary processing procedure of the control apparatus.

FIG. 10 is a flowchart showing an exemplary processing procedure at the time when the electronic control unit 100 according to the present first modification example selects a running mode. This flowchart is obtained by replacing S20 and S22 in the flowchart of FIG. 9 with S20A and S22A respectively. The other steps (the steps to which the same numerals as in FIG. 9 are assigned) are the same as in FIG. 9, so detailed description thereof will not be repeated herein.

If the required driving torque is larger than the first level value L1 (NO in S10, the electronic control unit 100 determines in S20A whether or not the load level is the low load level. In making this determination, the electronic control unit 100 uses the above-mentioned "predicted value of the first MG rotational speed Nm1" as the load level. The electronic control unit 100 calculates an optimal rotational speed of the engine 10 satisfying the required driving force, and calculates the predicted value of the first MG rotational speed Nm1 from the optimal rotational speed of the engine 10 and the rotational speed of the output shaft 70 corresponding to the current vehicle speed, using the relationship of the alignment chart.

Then, if the predicted value of the first MG rotational speed Nm1 is lower than a threshold N1, the electronic control unit 100 determines that the load level is the low load level. It should be noted herein that the threshold N1 is set to a negative value that is smaller than "0" by a predetermined value. That is, the motive power transmission efficiency in the series-parallel mode is maximized when the deceleration ratio γ is equal to the optimal deceleration ratio $\gamma_c$, namely, when the first MG rotational speed Nm1 is equal to 0 (see FIG. 7). The motive power transmission efficiency in the series-parallel mode falls due to the occurrence of motive power circulation when the deceleration ratio γ is smaller than the optimal deceleration ratio $\gamma_c$, namely, when the first MG rotational speed Nm1 assumes a negative value (see FIG. 8). In view of this, the threshold N1 is set to a negative value that is smaller than "0" by a predetermined value.

Besides, the electronic control unit 100 determines in S22A whether or not the load level is the intermediate load level. In making this determination as well, the electronic control unit 100 uses the above-mentioned "predicted value of the first MG rotational speed Nm1" as the load level. The electronic control unit 100 determines that the load level is the intermediate load level when the predicted value of the first MG rotational speed Nm1 is higher than the threshold N1 and lower than a threshold N2. It should be noted herein that the threshold N2 is set to a positive value that is larger than "0" by a predetermined value. That is, the motive power transmission efficiency in the series-parallel mode falls due to a large electric power conversion loss when the deceleration ratio γ is larger than the optimal deceleration ratio $\gamma_c$, namely, when the first MG rotational speed Nm1 assumes a high positive value. In view of this, the threshold N2 is set to the positive value that is larger than "0" by the predetermined value.

As described above, in the present modification example, the predicted value of the first MG rotational speed Nm1 is used as the parameter indicating the load level in the HV running mode. In this manner as well, the optimal running mode can be selected in the same manner as in the above-mentioned embodiment of the disclosure.

In the present modification example in particular, the series-parallel mode is selected when the predicted value of the first MG rotational speed Nm1 is higher than the threshold N1 and lower than the threshold N2. Then, in view of the fact that the motive power transmission efficiency in the series-parallel mode is maximized when the first MG rotational speed Nm1 is equal to "0" (see FIG. 7), "the threshold N1" is set to the negative value that is smaller than 0 by the predetermined value, and "the threshold N2" is set to the positive value that is larger than 0 by the predetermined value. Thus, the region where the series-parallel mode is selected includes the region where the first MG rotational speed Nm1 is equal to 0. As a result, when the series-parallel mode is selected, the motive power transmission efficiency can be held at a high level by making the first MG rotational speed Nm1 equal or close to 0 while optimizing the engine thermal efficiency.

In the above-mentioned embodiment of the disclosure, the predicted value of the deceleration ratio γ is used as the parameter indicating the load level in the HV running mode. Instead of the predicted value of the deceleration ratio γ, however, the required driving torque of the vehicle 1 may be used as the parameter indicating the load level.

Figure 11:
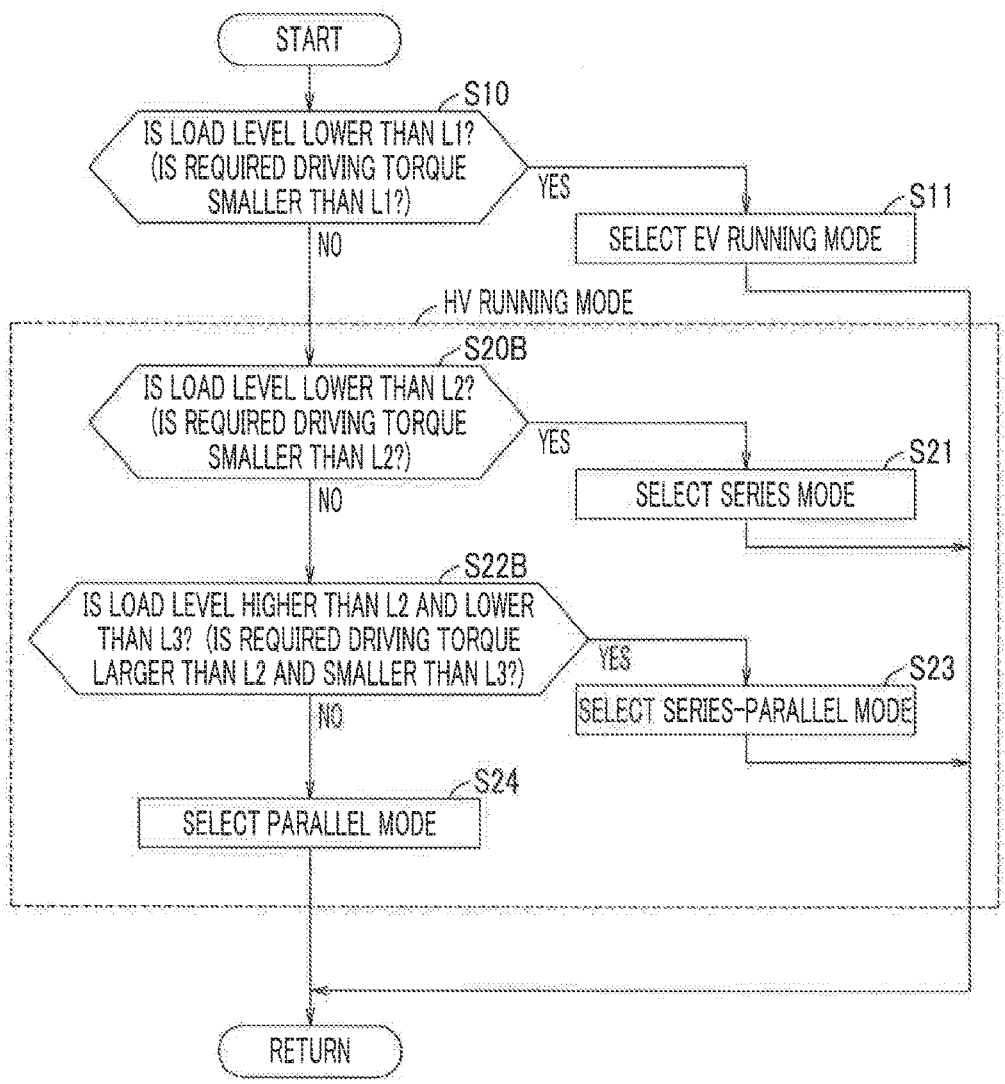
FIG. 11 is a flowchart (part 3) showing an exemplary processing procedure of the control apparatus.

FIG. 11 is a flowchart showing an exemplary processing procedure at the time when the electronic control unit 100 according to the present second modification example selects a running mode. This flowchart is obtained by replacing S20 and S22 in the flowchart of FIG. 9 with S20B and S22B respectively. The other steps (the steps to which the same numerals as in FIG. 9 are assigned) are the same as in FIG. 9, so detailed description thereof will not be repeated herein.

If the required driving torque is larger than the first level value L1 (NO in S10), the electronic control unit 100 determines in S20B whether or not the required driving torque is at the low load level that is lower than the second level value L2 (see FIG. 5). Besides, the electronic control unit 100 determines in S22B whether or not the required driving torque is at the intermediate load level that is higher than the second level value L2 and lower than the third level value L3 (see FIG. 5).

As described above, in the present modification example, the required driving torque of the vehicle 1 (the required driving torque with respect to the vehicle speed) is used as the parameter indicating the load level in the HV running mode. In this manner as well, the optimal running mode can be selected in the same manner as in the above-mentioned embodiment of the disclosure.

Incidentally, instead of the required driving torque, a required driving power or a required driving power with respect to the vehicle speed can also be used as the parameter indicating the load level in the HV running mode.

The configuration of the drive device 2 according to the above-mentioned embodiment of the disclosure may be modified, for example, as follows. FIGS. 12 to 15 are views schematically showing different configurations of the drive device in which the series mode, the series-parallel mode and the parallel mode can be selected.

Figure 12:
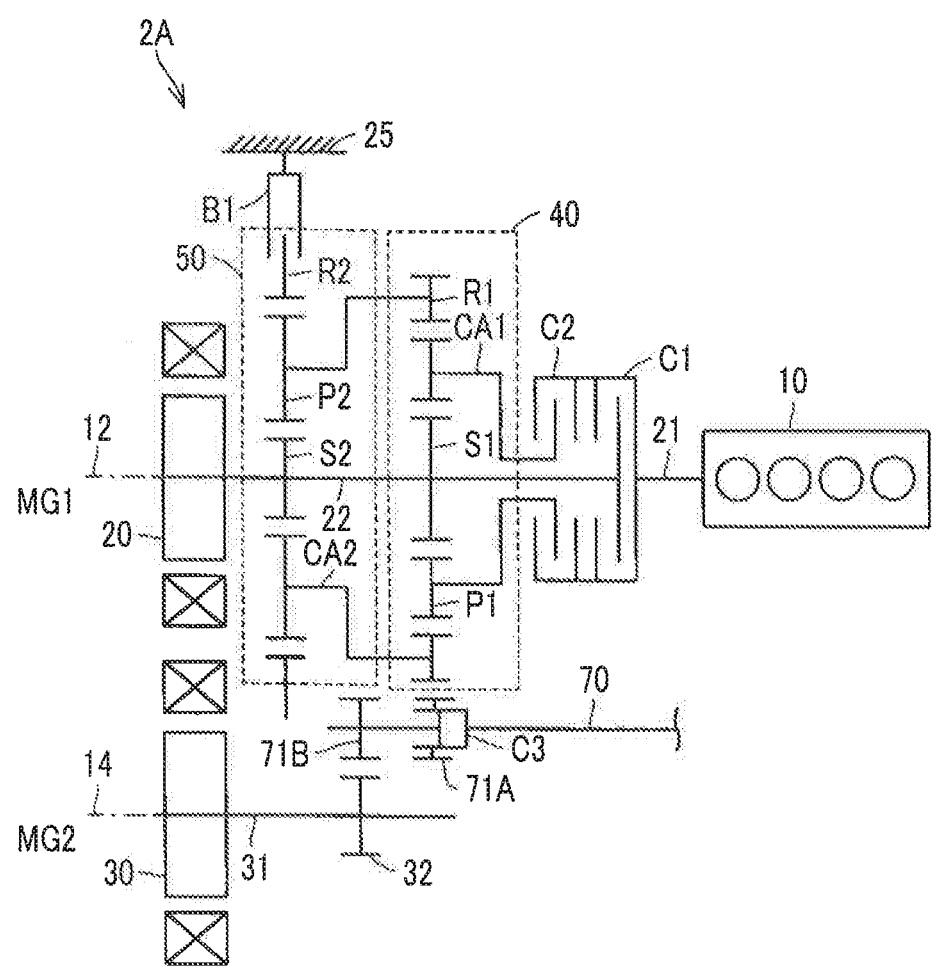
FIG. 12 is a view (part 1) schematically showing a drive device.
Figure 13:
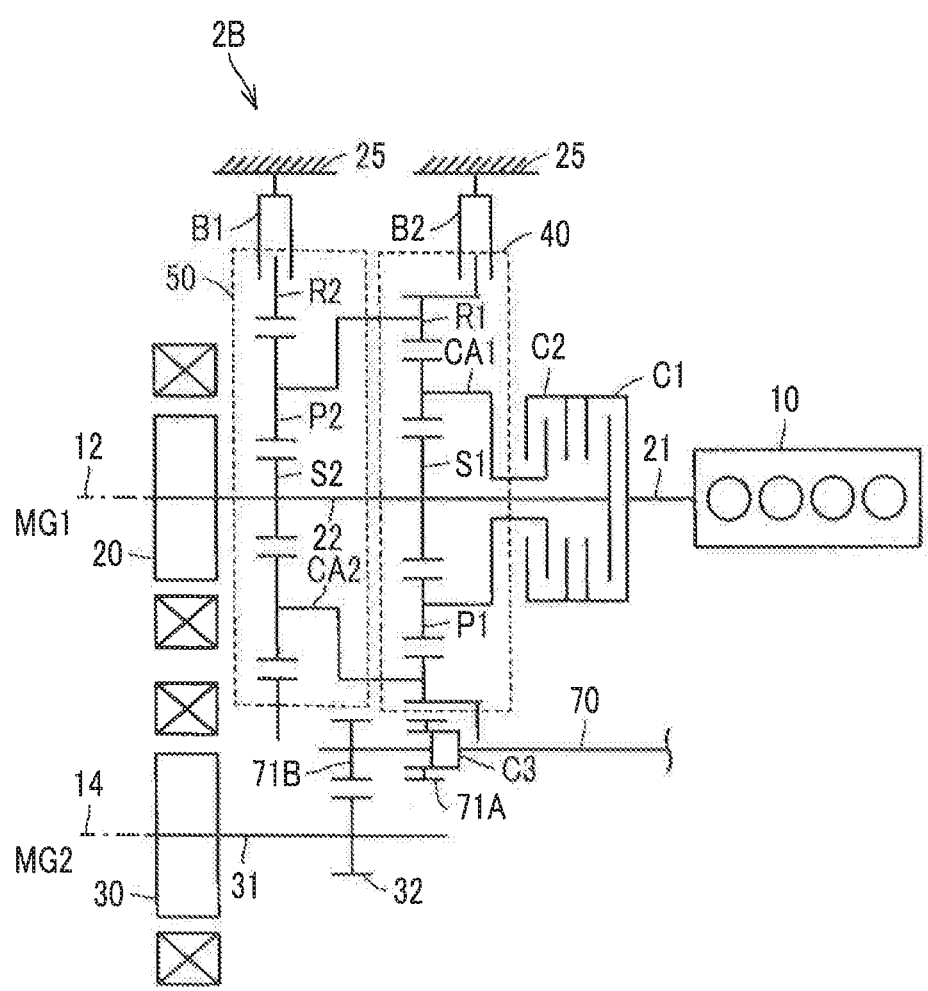
FIG. 13 is a view (part 2) schematically showing the drive device.

A drive device 2A shown in FIG. 12 is obtained by providing the output shaft 70 with driven gears 71A and 71B instead of the driven gear 71 and adding a clutch C3 to the drive device 2 shown in FIG. 1. A drive device 2B shown in FIG. 13 is obtained by further adding a brake B2 to the drive device 2A shown in FIG. 12.

Figure 14:
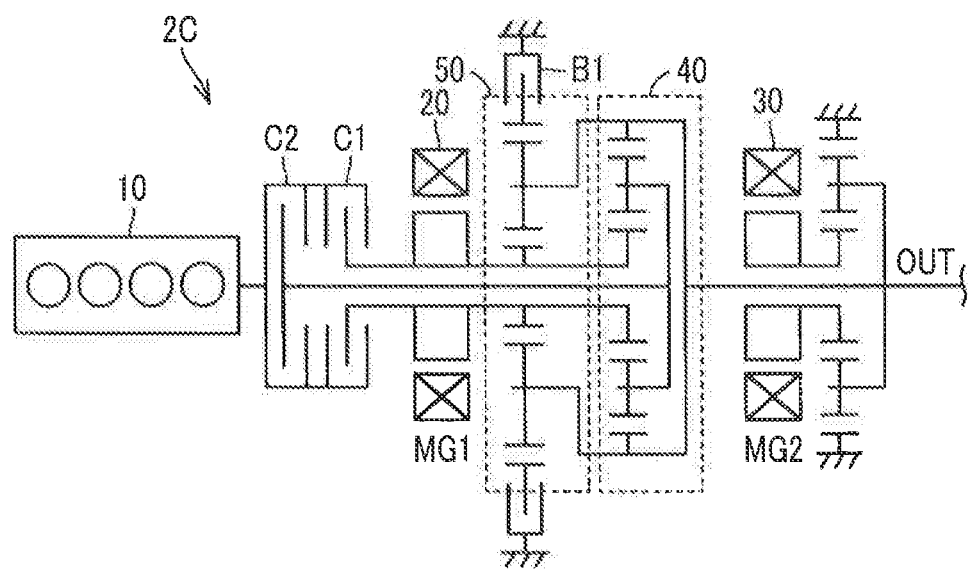
FIG. 14 is a view (part 3) schematically showing the drive device.
Figure 15:
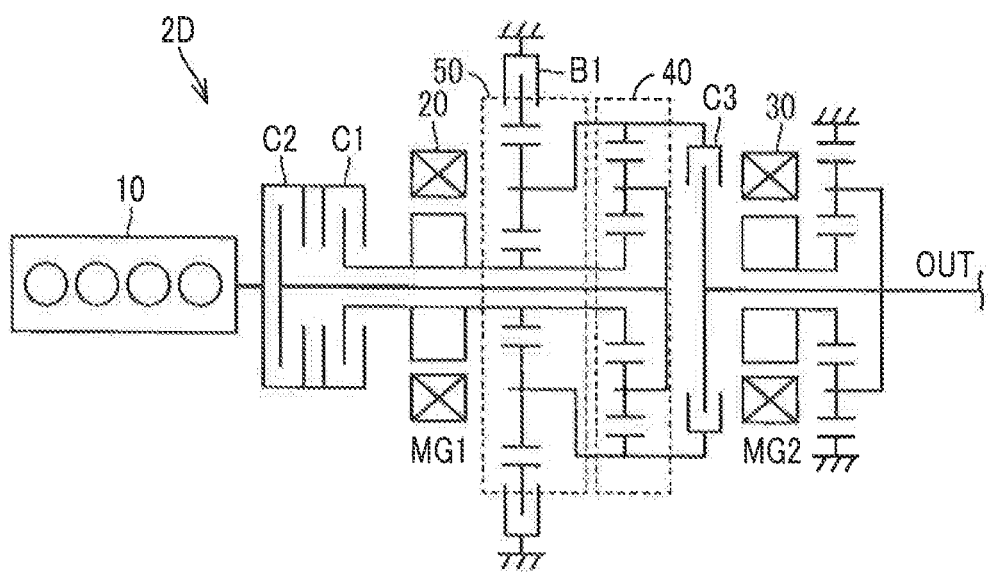
FIG. 15 is a view (part 4) schematically showing the drive device.

A drive device 2C shown in FIG. 14 is obtained by changing the arrangement of the drive device 2 of FIG. 1 such that the engine 10, the first MG 20 and the second MG 30 are arranged in this order coaxially with one another. A drive device 2D shown in FIG. 15 is obtained by changing the arrangement of the drive device 2A of FIG. 12 such that the engine 10, the first MG 20 and the second MG 30 are arranged in this order coaxially with one another.

In the above-mentioned embodiment of the disclosure, each of criterion levels to be compared with the load level (the first level value L1, the second level value L2 and the third level value L3 and the like) may be provided with a hysteresis. Thus, the running mode can be prevented from being frequently changed over due to fluctuations in the load level.

Besides, the above-mentioned embodiment of the disclosure and the modification examples thereof can also be appropriately combined with one another within such a range that no contradiction is caused from a technical point of view.

The embodiment of the disclosure disclosed herein should be considered to be exemplary and nonrestrictive in all respects. The scope of the disclosure is defined not by the foregoing description but by the claims. The disclosure is intended to encompass all the alterations that are equivalent in significance and scope to the claims.

What is claimed is:

1. A control apparatus for a hybrid vehicle,
the hybrid vehicle including an engine, a first rotating electrical machine, an output shaft, a second rotating electrical machine, a planetary gear mechanism and a changeover device,
the output shaft being connected to a driving wheel,
the second rotating electrical machine being connected to the output shaft,
the planetary gear mechanism mechanically coupling the engine, the first rotating electrical machine and the output shaft to one another, and
the changeover device being configured to change a coupling state of the planetary gear mechanism with respect to the engine and the output shaft,
the control apparatus comprising
an electronic control unit configured to:
control the changeover device such that the coupling state of the planetary gear mechanism is changed; and
select one of three running modes by changing the coupling state of the planetary gear mechanism in accordance with a load level of the hybrid vehicle,
the three running modes being a series mode, a series-parallel mode and a parallel mode,
the series mode being a mode in which a motive power of the engine is transmitted to the first rotating electrical machine and converted into an electric power,
the series-parallel mode being a mode in which part of a motive power of the engine is mechanically transmitted to the output shaft by a torque of the first rotating electrical machine, and the remaining motive power of the engine is transmitted to one of the first rotating electrical machine and the second rotating electrical machine and converted into an electric power,
the parallel mode being a mode in which a motive power of the engine is mechanically transmitted to the output shaft with a deceleration ratio mechanically fixed to a predetermined ratio,
the deceleration ratio being a ratio of a rotational speed of the engine to a rotational speed of the output shaft,
the load level of the hybrid vehicle decreasing in order from a first load level to a second load level and to a third load level,
the first load level being a load level at which the parallel mode is selected,
the second load level being a load level at which the series-parallel mode is selected, and
the third load level being a load level at which the series mode is selected.

2. The control apparatus for the hybrid vehicle according to claim 1, wherein
the electronic control unit is configured to determine the load level using a first predicted value as a parameter when the engine is assumed to be operated on an optimal fuel consumption operating line in the series-parallel mode, the first predicted value is a predicted value of the deceleration ratio determined, by the electronic control unit, from a driver's required driving force and a vehicle speed, the electronic control unit is configured to select the series mode when the first predicted value is smaller than a first threshold, the electronic control unit is configured to select the series-parallel mode when the first predicted value is larger than the first threshold and smaller than a second threshold, and the electronic control unit is configured to select the parallel mode when the first predicted value is larger than the second threshold.

3. The control apparatus for the hybrid vehicle according to claim 2, wherein the first threshold is set to a value that is smaller than an optimal deceleration ratio by a first predetermined value, the optimal deceleration ratio is the deceleration ratio when the engine is assumed to be operated on the optimal fuel consumption operating line in the series-parallel mode and a rotational speed of the first rotating electrical machine is assumed to be 0, and the second threshold is set to a value that is larger than the optimal deceleration ratio by a second predetermined value.

4. The control apparatus for the hybrid vehicle according to claim 1, wherein the electronic control unit is configured to determine the load level using a second predicted value as a parameter, the second predicted value is a predicted value of a rotational speed of the first rotating electrical machine, and is to be achieved when the engine is operated on an optimal fuel consumption operating line in the series-parallel mode, the electronic control unit is configured to select the series mode when the second predicted value is smaller than a third threshold, the electronic control unit is configured to select the series-parallel mode when the second predicted value is higher than the third threshold and lower than a fourth threshold, and the electronic control unit is configured to select the parallel mode when the second predicted value is higher than the fourth threshold.

5. The control apparatus for the hybrid vehicle according to claim 4, wherein the third threshold is set to a negative value that is lower than 0 by a third predetermined value, and the fourth threshold is set to a positive value that is higher than 0 by a fourth predetermined value.

6. The control apparatus for the hybrid vehicle according to claim 1, wherein the electronic control unit is configured to determine the load level using a required driving torque of the hybrid vehicle as a parameter, the electronic control unit is configured to select the series mode when the required driving torque is smaller than a third threshold, the electronic control unit is configured to select the series-parallel mode when the required driving torque is larger than the third threshold and smaller than a fourth threshold, and the electronic control unit is configured to select the parallel mode when the required driving torque is larger than the fourth threshold.

7. A control method for a hybrid vehicle, the hybrid vehicle including an engine, a first rotating electrical machine, an output shaft, a second rotating electrical machine, a planetary gear mechanism, a changeover device and an electronic control unit, the output shaft being connected to a driving wheel, the second rotating electrical machine being connected to the output shaft, the planetary gear mechanism mechanically coupling the engine, the first rotating electrical machine and the output shaft to one another, and the changeover device being configured to change a coupling state of the planetary gear mechanism with respect to the engine and the output shaft, the control method comprising:

controlling, by the electronic control unit, the changeover device such that the coupling state of the planetary gear mechanism is changed, and selecting, by the electronic control unit, one of three running modes, by changing the coupling state of the planetary gear mechanism in accordance with a load level of the hybrid vehicle, the three running modes being a series mode, a series-parallel mode and a parallel mode, the series mode being a mode in which a motive power of the engine is transmitted to the first rotating electrical machine and converted into an electric power, the series-parallel mode being a mode in which part of a motive power of the engine is mechanically transmitted to the output shaft by a torque of the first rotating electrical machine, and the remaining motive power of the engine is transmitted to one of the first rotating electrical machine and the second rotating electrical machine and converted into an electric power, the parallel mode being a mode in which a motive power of the engine is mechanically transmitted to the output shaft with a deceleration ratio mechanically fixed to a predetermined ratio, the deceleration ratio being a ratio of a rotational speed of the engine to a rotational speed of the output shaft, the load level of the hybrid vehicle decreasing in order from a first load level to a second load level and to a third load level, the first load level being a load level at which the parallel mode is selected, the second load level being a load level at which the series-parallel mode is selected, and the third load level being a load level at which the series mode is selected.

* * * * *